(12) United States Patent
Chong et al.

(10) Patent No.: US 11,227,071 B2
(45) Date of Patent: Jan. 18, 2022

(54) HARDWARE SECURITY TO COUNTERMEASURE SIDE-CHANNEL ATTACKS

(71) Applicant: Nanyang Technological University, Singapore (SG)

(72) Inventors: Kwen Siong Chong, Singapore (SG); Bah Hwee Gwee, Singapore (SG); Ali Akbar Pammu, Singapore (SG)

(73) Assignee: Nanyang Technological University, Singapore (SG)

( * ) Notice: Subject to any disclaimer, the term of this patent is extended or adjusted under 35 U.S.C. 154(b) by 218 days.

(21) Appl. No.: 16/491,059

(22) PCT Filed: Mar. 19, 2018

(86) PCT No.: PCT/SG2018/050122
§ 371 (c)(1),
(2) Date: Sep. 4, 2019

(87) PCT Pub. No.: WO2018/174819
PCT Pub. Date: Sep. 27, 2018

(65) Prior Publication Data
US 2020/0004992 A1    Jan. 2, 2020

(30) Foreign Application Priority Data
Mar. 20, 2017    (SG) .......................... 10201702226R

(51) Int. Cl.
*G06F 21/72*    (2013.01)
*G06F 21/55*    (2013.01)
(Continued)

(52) U.S. Cl.
CPC .............. *G06F 21/72* (2013.01); *G06F 21/55* (2013.01); *G06F 21/6218* (2013.01); *G06F 21/75* (2013.01)

(58) Field of Classification Search
CPC ...... G06F 21/72; G06F 21/55; G06F 21/6218; G06F 21/75; H04L 2209/08; H04L 9/003; H04L 9/3226; G09C 1/00
See application file for complete search history.

(56) References Cited

U.S. PATENT DOCUMENTS

| 8,958,550 B2 | 2/2015 | Tang et al. |
| 2004/0193898 A1 | 9/2004 | Ochi et al. |

(Continued)

FOREIGN PATENT DOCUMENTS

| CN | 102523085 A | 6/2012 |
| CN | 104378196 A * | 2/2015 |

(Continued)

OTHER PUBLICATIONS

Aigner, M. et al., *A Novel CMOS Logic Style With Data Independent Power Consumption*, Proc. ISCAS (2005) 1066-1069.

(Continued)

*Primary Examiner* — Nelson S. Giddins
(74) *Attorney, Agent, or Firm* — Alston & Bird LLP

(57) ABSTRACT

A method and an apparatus for hardware security to countermeasure side-channel attacks are provided. The method or apparatus may introduce at least one redundant or partial redundant computation having a similar power dissipation profile or an electromagnetic emission profile when compared to that of a genuine operation for cryptographic devices, and/or to reorder the iterations of operations in a different sequence. The redundant or partial redundant computation may be performed by using a different password key and/or a different raw data (e.g., plaintext). The presence of the redundant or partial redundant computation would make side-channel attacks difficult in the sense that genuine (Continued)

or redundant/partial redundant operations are difficult to be clearly identified, hence serving as a countermeasure for hardware security.

20 Claims, 29 Drawing Sheets

(51) Int. Cl.
  *G06F 21/75* (2013.01)
  *G06F 21/62* (2013.01)

(56) References Cited

U.S. PATENT DOCUMENTS

| | | | |
|---|---|---|---|
| 2009/0010424 A1 | 1/2009 | Qi et al. | |
| 2009/0327664 A1* | 12/2009 | Yoshimi | G06F 21/755 |
| | | | 712/221 |
| 2012/0144205 A1 | 6/2012 | Shu et al. | |
| 2017/0026169 A1 | 1/2017 | Sugahara | |
| 2018/0097618 A1* | 4/2018 | Kumar | H03K 19/215 |

FOREIGN PATENT DOCUMENTS

| | | | | |
|---|---|---|---|---|
| CN | 104378196 A | | 2/2015 | |
| CN | 104734842 A | | 6/2015 | |
| GB | 2 345 229 A | | 6/2000 | |
| GB | 2345229 A | * | 6/2000 | ............. H04L 9/003 |

OTHER PUBLICATIONS

Bucci, M. et al., *Three Phase Dual-Rail Pre-Charge Logic*, Proc. Cryptographic Hardware and Embedded Systems (2006) 232-241.
Chen, Z. et al., *Dual-Rail Random Switching Logic: A Countermeasure to Reduce Side Channel Leakage*, Proc. Cryptographic Hardware and Embedded Systems (2005) 242-254.
Gornik, A. et al., *A Novel Circuit Design Methodology to Reduce Side Channel Leakage*, Security, Privacy, and Applied Cryptography Engineering, Lecture Notes in Computer Science, vol. 7644, Springer, Berlin, Heidelberg, Bogdanov et al. (eds) (2012) 1-15.
Gunevdas, I. et al., *Actor Positioning in Wireless Sensor and Actor Networks Using Matching Theory*, IEEE International Conference on Distributed Computing Systems Workshops, (2009-888-95.
Herbst, C. et al., *An AES Smart Card Implementation Resistant to Power Analysis Attacks*, Applied Cryptography and Network Security, ACNS 2006, Lecture Notes in Computer Science, vol. 3989, Springer, Berlin, Heidelberg, Zhou et al. (eds) (2006) 239-252.
Hwang, D. D. et al., *AES-Based Security Coprocessor IC in 0.18-μm CMOS With Resistance to Differential Power Analysis Side-Channel Attacks*, IEEE Journal of Solid-State Circuits, vol. 1, No. 1 (Apr. 2006) 781-791.
Lee, J-W. et al., *An Efficient DPA Countermeasure With Randomized Montgomery Options for DF-ECC Processor*, IEEE Transaction on Circuits and Systems—II: Express Briefs, vol. 59, No. 5 (May 2012) 287-291.
Liu, P-C. et al., *A Low Overhead DPA Countermeasure Circuit Based on Ring Oscillators*, IEEE Transactions on Circuits and Systems—II: Express Brief, vol. 57, No. 7 (Jul. 2010) 546-560.
Moore, S. et al., *Improving Smart Card Security Using Self-Timed Circuits*, Proc. ASYNC (2002) (211-218) 8 pages.
Popp, T. et al., *Evaluation of the Masked Logic Style MDPL on a Prototype Chip*, Cryptographic Hardware and Embedded Systems—CHES, Lecture Notes in Computer Science, vol. 4727 (2007) 81-94.
Popp, T. et al., *Masked Dual-Rail Pre-Charge Logic: DPA-Resistance Without Routing Constraints*, Proc. Cryptographic Hardware and Embedded Systems (2005) 172-186.
Renauld, M. et al., *Algebraic Side-Channel Attacks on the AES: Why Time also Matters in DPA*, Cryptographic Hardware and Embedded Systems—CHES 2009, Lecture Notes in Computer Science, vol. 5747, Springer, Berlin, Heidelberg, Clavier et al. (eds) (2009) 97-111.
Rostami, M. et al., *A Primer on Hardware Security: Models, Methods, and Metrics*, Proceedings of the IEEE, vol. 102, No. 8 (Aug. 2014) 1283-1295.
Sengupta, A., *Hardware Security of CE Devices*, IEEE Consumer Electronics Magazine (Jan. 2017) 130-133.
Tiri, K. et al., *A Dynamic and Differential CMOS Logic With Signal Independent Power Consumption to Withstand Differential Power Analysis on Smart Cards*, 28$^{th}$ European Solid-State Circuits Conf. (2002) (404-407) 4 pages.
Tokunaga, C. et al., *Securing Encryption Systems With a Switched Capacitor Current Equalizer*, IEEE Journal of Solid-State Circuits, vol. 45, No. 1 (Jan. 2010)-23-31.
Velegalati, R. et al., *Improving Security of SDDL Designs Through interleaved Placement on Xilinx FPGAs*, International Conference on Field Programmable Logic and Applications (FPL) (2011) (506-511) 6 pages.
Wang, B. et al., *Against Double Fault Attacks: Injection Effort Model, Space and Time Randomization Based Countermeasures for Reconfigurable Array Architecture*, IEEE Transactions on Information Forensics and Security, vol. 11, No. 6 (Jun. 2016) 1151-1164.
Yoo, H. et al., *Investigations of Power Analysis Attacks and Countermeasures for ARIA*, Information Security Applications, WISA 2006, Lecture Notes in Computer Science, vol. 498, Springer, Berlin Heidelberg, Lee et al. (eds) (2007) 160-172s.
Yu, L. et al., *The Application of Hybrid Encryption Algorithm in Software Security*, 2012 Fourth International Conference on Computational Intelligence and Communication Networks (CICN) (2012) 765-765.
International Search Report and Written Opinion for Application No. PCT/SG2018/050122 dated May 16, 2018, 9 pages.

* cited by examiner

| Fake 8-bit S-Box | 1st 8-bit S-Box | 2nd 8-bit S-Box | 3rd 8-bit S-Box | 4th 8-bit S-Box | 5th 8-bit S-Box | 6th 8-bit S-Box | 7th 8-bit S-Box | 8th 8-bit S-Box | 9th 8-bit S-Box | 10th 8-bit S-Box | 11th 8-bit S-Box | 12th 8-bit S-Box | 13th 8-bit S-Box | 14th 8-bit S-Box | 15th 8-bit S-Box | 16th 8-bit S-Box |

FIG. 17A

| Fake 16-bit S-Box | 1st 16-bit S-Box | 2nd 16-bit S-Box | 3rd 16-bit S-Box | 4th 16-bit S-Box | 5th 16-bit S-Box | 6th 16-bit S-Box | 7th 16-bit S-Box | 8th 16-bit S-Box |

FIG. 17B

| Fake 32-bit S-Box | 1st 32-bit S-Box | 2nd 32-bit S-Box | 3rd 32-bit S-Box | 4th 32-bit S-Box |

FIG. 17C

| Fake 64-bit S-Box | 1st 64-bit S-Box | 2nd 64-bit S-Box |

FIG. 17D

HARDWARE SECURITY TO COUNTERMEASURE SIDE-CHANNEL ATTACKS

CROSS-REFERENCE TO RELATED APPLICATIONS

This application is a national phase entry of International Application No. PCT/SB2018/050122, filed Mar. 19, 2018, which claims priority to SG Application No. 10201702226R, filed Mar. 20, 2017, the entire contents of which are incorporated herein by reference.

TECHNICAL FIELD

Various aspects of this disclosure generally relate to computer security, and more particularly, to hardware security to countermeasure side-channel attacks (SCAs).

BACKGROUND

Hardware security involves hardware design, access control, secure multi-party computation, secure key storage, ensuring code authenticity, measures to ensure that the supply chain that built the product is secure among other things. Hardware security is highly critical for defense or security applications, and to some extent, increasingly for ubiquitous electronics including Internet-of-Things (IoTs). This is because security attacks/threats to hardware are increasingly perturbing for various hostile intentions, potentially resulting in monetary loss and in the worst-case, life are at risk of loss. For example, personal/confidential data stored in smart-chips may be extracted by unauthorized parties. Paid/value-added applications/services may be cracked. Proprietary information and trade secrets may be leaked. Proprietary goods may be mass-produced or cloned without investment in research and development. Denial of service (caused by dishonest competitors) is possible. Trojans or bugs may be installed. In the worst-case scenario, life could be lost. For example, life-critical medical devices may be disrupted.

There could have many levels of hardware protection. Mathematical-robust encryption/decryption algorithms (e.g. Advanced Encryption Standard (AES), Triple Data Encryption Standard (Triple DES), etc.) may be adopted to encrypt confidential data in hardware. This can be done by using a password key to encrypt a plaintext (raw data) to a cipher-text (encrypted data). The cipher-text can only be decrypted with the knowledge of the password key. The entire encryption/decryption processes involve a series of operations performed in the hardware. However, such 'software-based' hardware protection is insufficient because hardware security could still be compromised under various forms of attacks. One form of these attacks is side-channel-attack (SCA).

A side-channel attack is any attack based on information gained from the physical implementation of a computer system, rather than weaknesses in the implemented algorithm itself. For example, timing information, power consumption, electromagnetic leaks or even sound can provide an extra source of information, which may be exploited in a side-channel attack. SCA may monitor the (analog) electrical characteristics of supply, interface connections and any electromagnetic emission. A specific SCA may use one or more of the correlation-power-analysis (CPA) that monitors the power dissipation, the correlation-electromagnetic-analysis (CEMA) that monitors the electromagnetic emission, and the fault attack that monitors the outputs at the presence of faults.

FIG. 1 depicts an example of a power dissipation profile 100 over time for performing one complete AES encryption. In the example, the AES encryption may include 10 rounds of computation. The power dissipation profile 100 may be analyzed in CPA. As shown in FIG. 1, 10 localized power dissipation profiles 102-120, corresponding to the 10 rounds of computation, can be easily identified from the power dissipation profile 100. These localized power dissipation profiles can leak the password key when the power dissipation profiles of many encryption operations are repeatedly monitored, aiming to analyze the correlation between the power dissipation and its data dependency. Similarly, CEMA can also be used to analyze the correlation between the electromagnetic emission and its data dependency, aiming to reveal the password key. Conversely, the fault attack may inject faults to disrupt the computations, where the faulty outputs could provide hints to reveal the password key.

Given an AES encryption, equation (1) generalizes the mathematical analysis of CPA and CEMA by analyzing the correlation ($r_{i,j,t}$) between the leakage information ($Y_{t,m}$ as power dissipation or electromagnetic emission) and the processed data ($X_{i,j,m}$). The analysis is conducted by partitioning a 128-bit password key into 16 sets of 8-bit sub-password keys, called sub-keys, followed by the smaller search-space analysis (with $2^8$ sub-key candidates) for each sub-key. Through the analysis in equation (1), the sub-key candidate having the highest correlation is likely to be the real sub-key. Hence, the whole password key may be revealed by combining all the sub-keys that have the highest correlation ($r_{i,j,t}$) within their possible sub-key candidates. To quantify the SCA-resistance, the well-accepted matric is the number N, i.e., the number of measurements (traces) required in order to clearly establish a strong correlation. The higher the number N required, the higher the SCA-resistance is. For completeness, the accepted value of N is at least having 1 million measurement traces so that the hardware could be considered SCA-resistant.

$$r_{i,j,t} = \frac{\sum_{m=1}^{N}(X_{i,j,m}-\overline{X}_{i,j})(Y_{t,m}-\overline{Y}_t)}{\sqrt{\sum_{m=1}^{N}(X_{i,j,m}-\overline{X}_{i,j})^2} \cdot \sqrt{\sum_{m=1}^{N}(Y_{t,m}-\overline{Y}_t)^2}} \quad (1)$$

where i=1, . . . , 16 sub-keys in 128-bit password key; such sub-key has 8-bit, j=1, . . . , 256 possible sub-key candidates ($2^8$ combinations in an 8-bit sub-key), N=the number of measurements (traces), t=the sampling points for leakage information, $\overline{X}_{i,j}$ denotes the mean value of the processed data, $\overline{Y}_t$ denotes the mean value of the leakage information.

To counteract SCA as an additional hardware protection, traditional prevention approaches are based on the concepts of "Hiding" and "Masking". The "Hiding" approaches aim to balance the leakage information (e.g. power dissipation or electromagnetic emission traces) such that the analyzing process is long, and in the best case, infinity. The "Masking" approaches aim to mask the relationship/correlation of the leakage information such as the analysis process is difficult, and in theory, untraceable. Although to some extent, these approaches have somewhat improved the hardware security, they nonetheless often involve ad-hoc implementations (complex engineering efforts) and suffer from high hardware/power/speed overheads. In fact, most of the hardware are not designed to feature hardware security partly due to cost issues and partly due to the reason that the existing digital circuit design platform does not support such security feature. In addition, some traditional techniques to counteract SCA may be overcome by re-alignment techniques such as pre-processing and pattern matching, mitigating the efficacy for SCA-resistance.

In view of the limitation of the traditional techniques, it is highly desirable to have a SCA countermeasure technique to increase the SCA-resistance so that the pre-processing technique and pattern matching are ineffective.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

This disclosure describes a computational method or apparatus for hardware security to countermeasure side-channel attacks, including the correlation power analysis and the correlation electromagnetic analysis. The method or apparatus may introduce at least one redundant or partial redundant computation having a similar power dissipation profile or an electromagnetic emission profile when compared to that of a genuine operation for cryptographic devices, and/or to reorder the iterations of operations therein (in a different sequence). The redundant or partial redundant computation may be performed by using a different password key and/or a different raw data (e.g., plaintext). The presence of the redundant or partial redundant computation would make the CPA and CEMA difficult in the sense that genuine or redundant/partial redundant operations are difficult to be clearly identified, hence serving as a countermeasure for hardware security. The method or apparatus disclosed in this disclosure may feature tens to hundreds orders of magnitude more effective than traditional approaches.

In one aspect of the disclosure, a method, a computer-readable medium, and an apparatus for encrypting at least one plaintext to at least one cipher-text using at least one password key. The apparatus may perform at least one genuine computation that is dependent on the at least one plaintext and the at least one password key. The apparatus may emit first analog electrical characteristics in response to the performing of the at least one genuine computation. The apparatus may perform at least one redundant computation that is independent of the at least one plaintext or the at least one password key. The apparatus may emit second analog electrical characteristics in response to the performing of the at least one redundant computation. The second analog electrical characteristics may resemble the first analog electrical characteristics such that a metric of similarity between the first analog electrical characteristics and the second analog electrical characteristics satisfies a threshold.

In another aspect of the disclosure, a method, a computer-readable medium, and an apparatus for decrypting at least one cipher-text to at least one plaintext using at least one password key. The apparatus may perform at least one genuine computation that is dependent on the at least one cipher-text and the at least one password key. The apparatus may emit first analog electrical characteristics in response to the performing of the at least one genuine computation. The apparatus may perform at least one redundant computation that is independent of the at least one cipher-text or the at least one password key. The apparatus may emit second analog electrical characteristics in response to the performing of the at least one redundant computation. The second analog electrical characteristics may resemble the first analog electrical characteristics such that a metric of similarity between the first analog electrical characteristics and the second analog electrical characteristics satisfies a threshold.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

BRIEF DESCRIPTION OF THE DRAWINGS

FIGS. 17A-17D depict examples of the iteration operation sequence to compute all 128-bit S-Box operations where an imitation iteration of S-Box operation is inserted.

DETAILED DESCRIPTION

Figure 1:
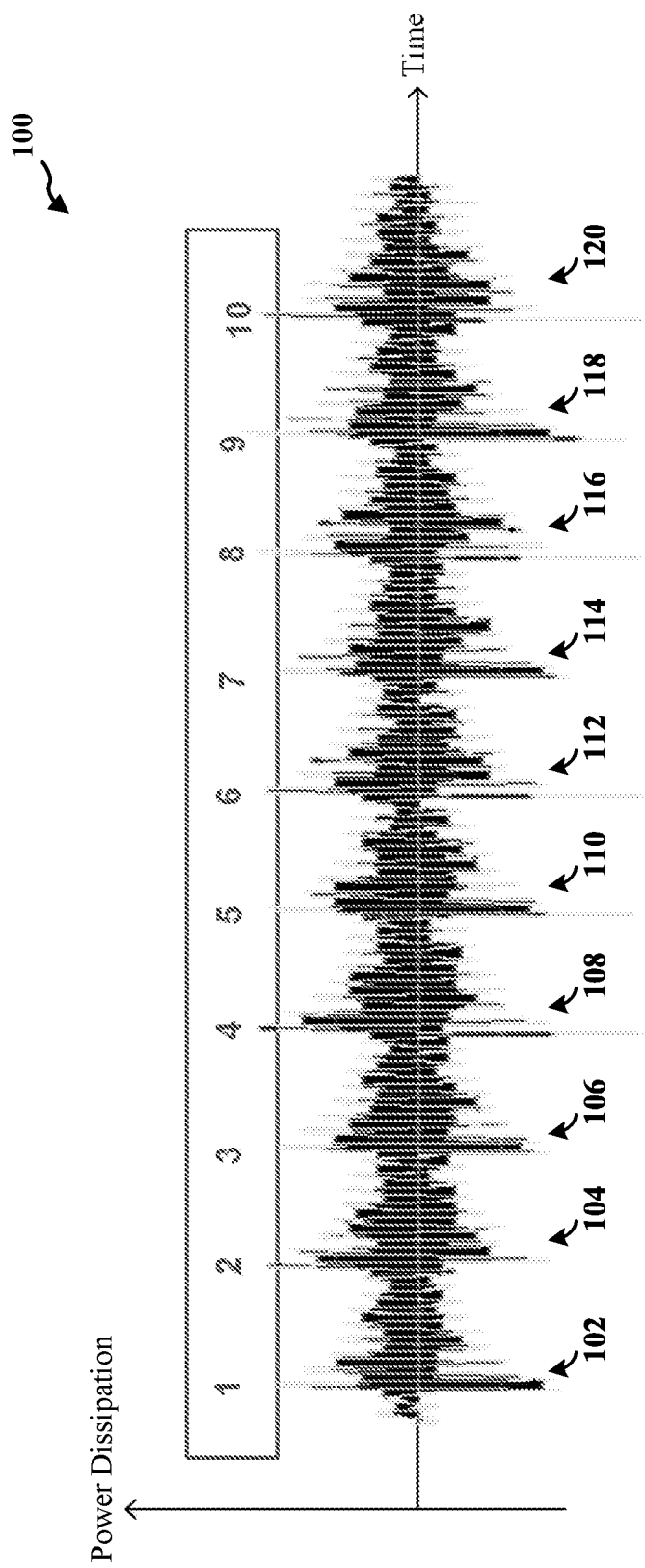
FIG. 1 depicts an example of a power dissipation profile over time for performing one complete AES encryption.

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of providing hardware security to countermeasure side-channel attacks will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some embodiments of the disclosure pertains to a computational method to counteract SCA, including CPA and CEMA. In some embodiments, a hardware is provided to compute an encryption algorithm in one complete encryption process. The encryption algorithm may use a password key to encrypt a plaintext to a cipher-text. The hardware computes not only at least one round of genuine computation(s) which is dependent both on the password key and the plaintext, but also at least one round of (redundant) computational imitation(s) which is independent of the password key and/or the plaintext. The sequence of computations for the at least one round of genuine computation(s) and the at least one round of computational imitation(s) may be random. Only the at least one round of genuine computation(s) collectively generates the cipher-text. The at least one round of computational imitation(s) may have similar analog electrical characteristics to the at least one round of the genuine computation(s).

In some embodiments, a hardware is provide to compute a decryption algorithm in one complete decryption process. The decryption algorithm may use a password key to decrypt a cipher-text to a plaintext. The hardware computes not only at least one round of genuine computation(s) which is dependent both on the password key and the cipher-text, but also at least one round of (redundant) computational imitation(s) which is independent of the password key and/or the cipher-text. The sequence of computations for the at least one round of genuine computation(s) and the at least one round of computational imitation(s) may be random. Only the at least one round of genuine computation(s) collectively generates the plaintext. The at least one round of computational imitation(s) may have similar analog electrical characteristics to the at least one round of the genuine computation(s).

In some embodiments, a hardware is provided to compute an encryption algorithm in one complete encryption process. The encryption algorithm may use a password key to encrypt a plaintext to a cipher-text. The hardware may compute at least one round of computation(s) that is dependent on both the password key and the plaintext. The at least one round of computation may include at least two partial computations. Each partial computation generates not only partial output that is dependent on the password key and the plaintext, but also redundant output that is independent of the password key and/or the plaintext. The at least two partial computations collectively generate the cipher-text. Each of the at least two partial computations may have similar analog electrical characteristics to each other, and to the at least one round of the computation(s).

In some embodiments, a hardware is provided to compute a decryption algorithm in one complete decryption process. The decryption algorithm may use a password key to decrypt a cipher-text to a plaintext. The hardware may compute at least one round of computation(s) that is dependent on both the password key and the plaintext. The at least one round of computation(s) may include at least two partial computations. Each partial computation generates partial output that is dependent on the password key and the cipher-text, but also redundant output which is independent on the password key and/or the cipher-text. The at least two partial computations collectively generate the plaintext. Each of the at least two partial computations may have similar analog electrical characteristics to each other, and to the at least one round of the computation(s).

In some embodiments, a hardware is provided to compute an encryption algorithm in one complete encryption process. The encryption algorithm may use a password key to encrypt a plaintext to a cipher-text. The hardware may compute at least one round of computation(s) that is dependent on both the password key and the plaintext. The at least one round of computation(s) may have serial operations that include at least one iteration of genuine substitution-box (S-Box) computation which is dependent on the plaintext, and at least one iteration of S-Box (redundant) computational imitation which is independent of the plaintext. The sequence of computations for the at least one iteration of genuine S-Box computation and the at least one iteration of S-Box computational imitation may be random. Only the at least one iteration of genuine S-Box computation collectively generates the cipher-text. The at least one iteration of S-Box computational imitation may have similar analog electrical characteristics to the at least one iteration of genuine S-Box computation.

In some embodiments, a hardware is provided to compute a decryption algorithm in one complete decryption process. The decryption algorithm may use a password key to decrypt a cipher-text to a plaintext. The hardware may compute at least one round of computation(s) that is dependent on both the password key and the cipher-text. The at least one round of computation(s) may have serial operations that include at least one iteration of genuine inverse S-Box computation which is dependent on the cipher-text, and at least one iteration of inverse S-Box computational imitation which is independent of the cipher-text. The sequence of computations for the at least one iteration of genuine inverse S-Box computation and the at least one iteration of inverse S-Box computational imitation may be random. Only the at least one iteration of genuine inverse S-Box computation collectively generates the plaintext. The at least one iteration of inverse S-Box computational imitation may have similar analog electrical characteristics to the at least one iteration of the genuine inverse S-Box computation.

In some embodiments, a hardware is provide to compute an encryption algorithm in one complete encryption process. The encryption algorithm may use a password key to encrypt a plaintext to a cipher-text. The hardware may compute at least one round of computation(s) that is dependent on both the password key and the plaintext. The at least one round of computation(s) may have serial operations that include at least one iteration of S-Box computation which is dependent on the plaintext. The sequence of computations for the at least one iteration of S-Box computation may be random. Only the at least one iteration of S-Box computation collectively generates the cipher-text.

In some embodiments, a hardware is provided to compute a decryption algorithm in one complete decryption process. The decryption algorithm may use a password key to decrypt a cipher-text to a plaintext. The hardware may compute at least one round of computation(s) that is dependent on both the password key and the cipher-text. The at least one round of computation may have serial operations that include at least one iteration of inverse S-Box computation which is dependent on the cipher-text. The sequence of computations for the at least one iteration of inverse S-Box computation may be random. Only the at least one iteration of inverse S-Box computation collectively generates the cipher-text.

The primary advantage of the disclosed embodiments is to significantly and exponentially increase the difficulty of SCA on a cryptographic hardware. Table I tabulates the effective measurement traces in order to attack a cryptographic hardware using the standard (benchmark) approach, a first embodiment with one computational imitation, a second embodiment with two computational imitations, and a third embodiment with three computational imitations. The scenarios where the standard approach requires the minimum measurement traces N=10, 20, 50, 100, and 1,000 for SCA are analysed. Should the embodiments be adopted, the adversary needs to re-align the genuine and imitation measurement traces so that the overall effective measurement traces are increased from N to $2^N$ with having 1 computational imitation, from N to $3^N$ with having 2 computational imitations, and from N to $4^N$ with having 3 computational imitations. For example, if N=1,000 for the standard approach, the embodiments will need significantly more effective measurement traces—$1.07 \times 10^{301}$ effective measurement traces with having 1 computational imitation, $1.32 \times 10^{477}$ effective measurement traces with having 2 computational imitations, and $1.15 \times 10^{602}$ effective measurement traces with having 3 computational imitations. By the current standard, the benchmark approach requires at least 1 million effective measurement traces for hardware security. Embodiments of this disclosure can compound tens to hundreds orders of magnitude more effective measurement traces, making the SCA on a hardware extremely difficult.

TABLE I

Estimated scenarios - the effective measurement traces required with the standard approach, and with embodiments having 1 computational imitation, 2 computational imitations, and 3 computational imitations.

| Standard with minimum measurement traces (N) | Embodiments of the Disclosure | | |
|---|---|---|---|
| | 1 Imitation ($2^N$) | 2 Imitations ($3^N$) | 3 Imitations ($4^N$) |
| 10 | 1,024 | 59,049 | 1,048,576 |
| 20 | 1,048,576 | ≈3.48 × $10^9$ | ≈1.10 × $10^{12}$ |
| 50 | ≈1.13 × $10^{15}$ | ≈7.18 × $10^{23}$ | ≈1.27 × $10^{30}$ |
| 100 | ≈1.27 × $10^{30}$ | ≈5.15 × $10^{47}$ | ≈1.61 × $10^{60}$ |
| 1,000 | ≈1.07 × $10^{301}$ | ≈1.32 × $10^{477}$ | ≈1.15 × $10^{602}$ |

Figure 2:
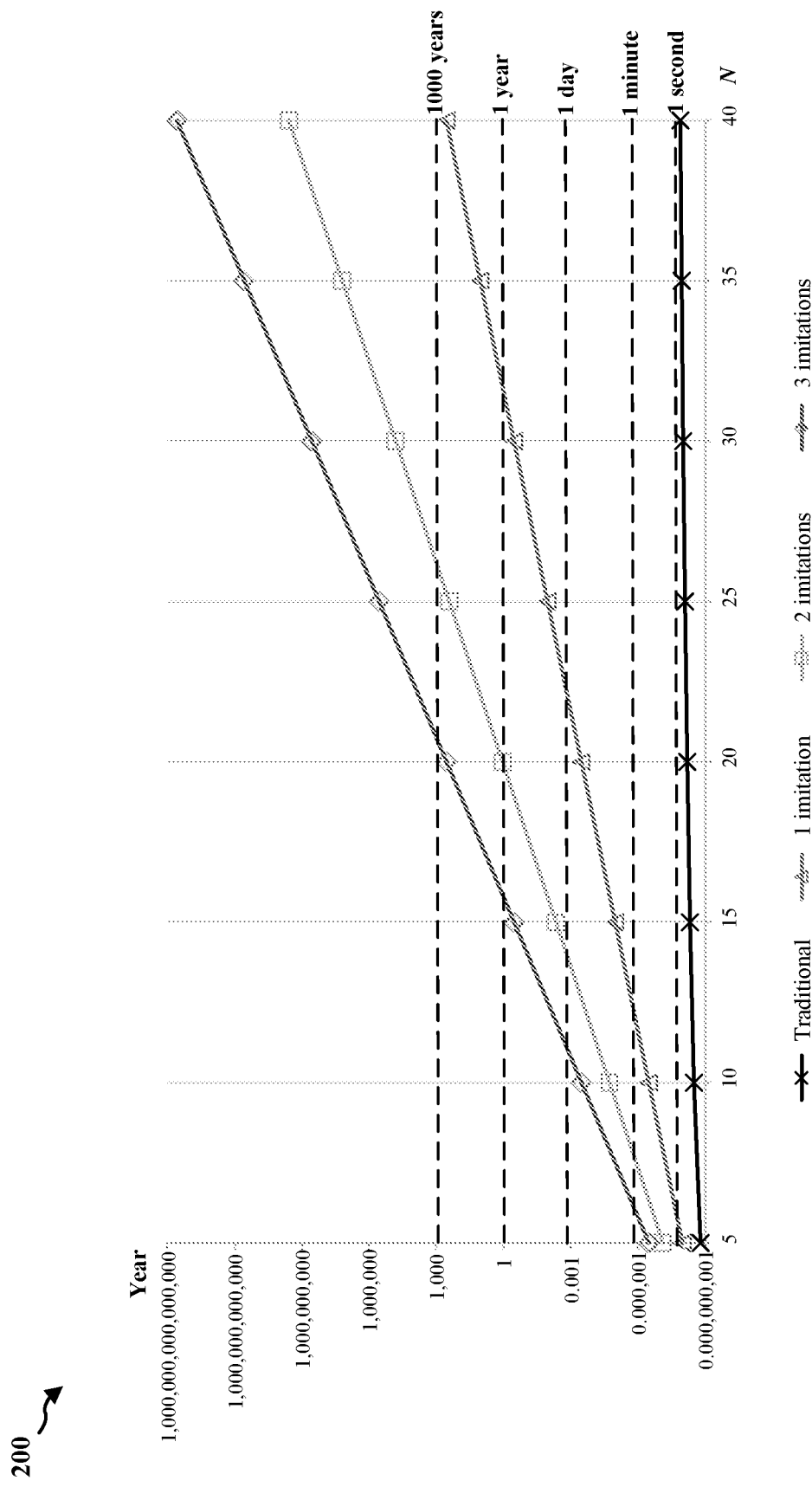
FIG. 2 is a chart depicting the time duration required to attack the hardware successfully by using a traditional method, a first embodiment with having 1 computational imitation, a second embodiment with having 2 computational imitations, and a third embodiment with having 3 computational imitations.

To further interpret the security feature of the embodiments in the disclosure, some embodiments are evaluated based on the time duration in order to attack a hardware successfully. Assuming that it takes 1 second per 100 measurement traces to attack a hardware, FIG. 2 is a chart 200 depicting the time duration required to attack the hardware successfully by using a traditional method, a first embodiment with having 1 computational imitation, a second embodiment with having 2 computational imitations, and a third embodiment with having 3 computational imitations. In FIG. 2, the time duration with N=5, 10, 15, 20, 25, 30, 35 and 40 is plotted. The effective measurement traces (with the based value N) embodying the embodiments will be exponentially compounded. As shown in FIG. 2, the traditional design can be simply attacked within 1 second when N is small (e.g. 40), where the designs embodying the embodiments of the disclosure are much more secured. When N=20, the designs embodying the embodiments with one computational imitation, with two computational imitations, and with three computational imitations could be attacked in about 3 hours (somewhat difficult), 1.1 years (very difficult), and 349 years (extremely difficult), respectively. Should N be larger, the time duration will be even much longer. For example, when N=35, the hardware designs embodying the embodiment with only one computational imitation could need more than 10 years to be compromised by an SCA.

In line with the primary advantage, the second advantage of the disclosed embodiments is scalability to the security features. As shown in Table I and FIG. 2, the security feature of the disclosed embodiments can be significantly enhanced by allowing more imitations. Such scalability is good to trade-off the different design parameters, including time, power dissipation, and security features. Despite such scalability, an embodiment with even 1 imitation should be very secure, where 40 (N=40) measurement traces could lead to as many as 349 years to get the password key broken in a hardware.

The third advantage of the disclosed embodiments is the low overheads, including the area overhead, the performance overhead, and the power overhead. For example, assuming a 128-bit AES hardware needs to be secured, Table II tabulates the best estimation for the performance, power dissipation and hardware overheads using the traditional methods and one embodiment with one imitation. Put simply, the embodiment incurs very low overheads.

TABLE II

Comparison of the performance, power dissipation, and hardware overheads using the traditional methods and one embodiment with one imitation.

| | Performance Overhead | Power Dissipation Overhead | Hardware Overhead |
|---|---|---|---|
| Dual-Rail Logic | 1.2x-2.0x | 2.0x-4.0x | 2.0x-3.0x |
| Current Equalizer | 1.1x | 1.5x | 1.2x |
| Random Noise Injection | 1.5x-2.0x | 1.5x-2.0x | 1.5x-2.0x |
| Asynchronous-Logic | 1.5x-2.5x | 2.5x-4.0x | 2.5x-3.5x |
| Shuffling | 1.1x-1.5x | 1.1x-1.5x | 1.1x-1.5x |
| Dummy Operation | 1.1x-1.5x | 1.5x-2.0x | 1.5x-2.0x |
| Embodiment (1 imitation) | 1.1x | 1.1x | 1.1x-1.5x |

The fourth advantage is that some embodiments are simultaneously CPA-resistant and CEMA-resistant. The traditional methods, on the other hand, may be advantageous to CPA-resistance but not to CEMA-resistance, or vice versa. Viewed differently, the traditional methods could be attacked successfully in either CPA or CEMA, hence not robust.

The fifth advantage is that some embodiments are also applicable to prevent the fault attack. This is because the sequence of the genuine operation has been randomized, making it difficult to inject faults into a correct sequence.

The sixth advantage is that the disclosed embodiments may be easily applied in many hardware design platforms, including Field-Programmable-Gate-Array (FPGA), application-specific-integrated circuit (ASIC), hardware/software microcontroller platforms, etc. Unlike some traditional methods, for example, the dual-rail logic can only be implemented in an ASIC platform. In other words, the disclosed embodiments are more practical (from the implementation viewpoint). In view of the foregoing, the disclosed embodiments are the preferred methods for hardware security to mitigate SCAs.

Figure 3:
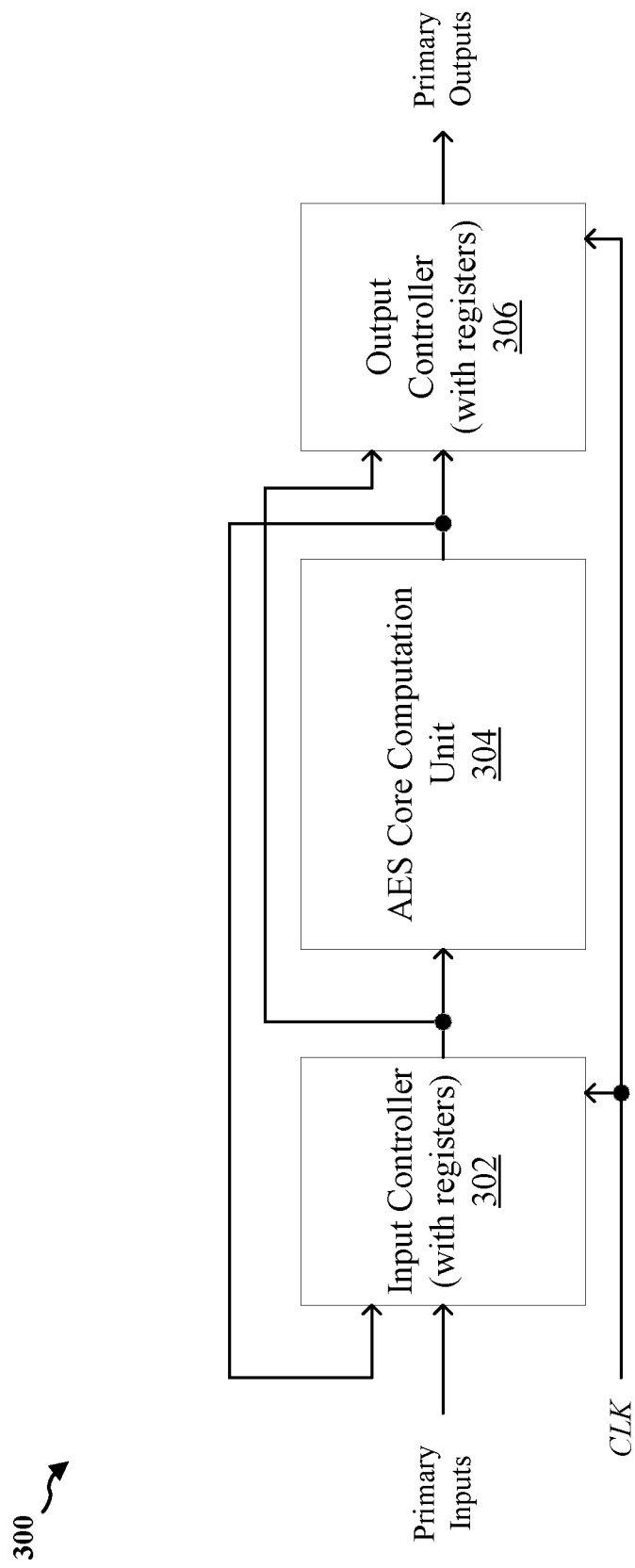
FIG. 3 depicts an example block diagram of an AES design comprising an input controller, an AES core computation unit, and an output controller.

FIG. 3 depicts an example block diagram of an AES design 300 comprising an input controller 302, an AES core computation unit 304, and an output controller 306. In the AES design 300, 10 rounds of computation (where the first AddRound operation can be pre-computed) or 11 rounds of computation are computed iteratively to produce a complete 128-bit AES encryption. The clock signal (CLK) is used to synchronize the computations via the input controller 302 and the output controller 306. The input controller 302 receives the primary inputs (including the plaintext, the password key, and other control signals), and generates intermediate signals (i.e., intermediate data and intermediate password key) to let the AES core computation unit 304 to iteratively compute each round of computations. Before the last round of computation, the (intermediate) outputs of the AES core computation unit 304 are fed back to the input controller 302. For the last round of computation, the output controller 306 produces the primary output signals (including the cipher-text and other control signals for synchronization). Depending on the data synchronization, an AES encryption would take 11 to 13 (or more) clock cycles.

Figure 4A:
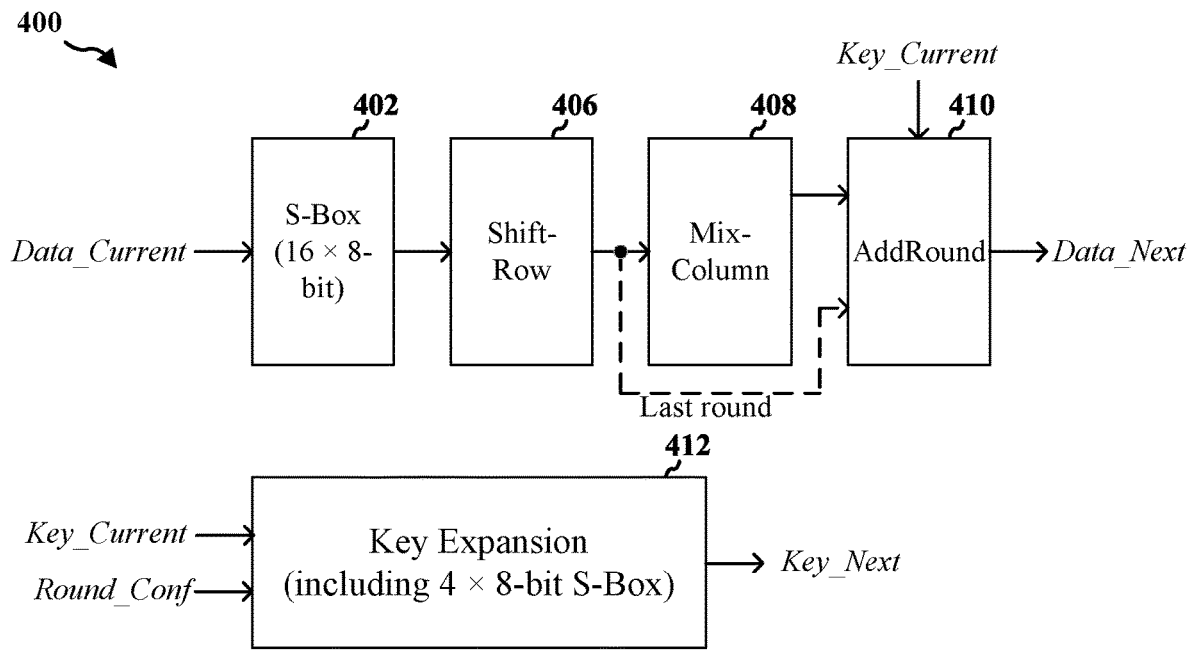
FIGS. 4A and 4B depict an example of the main operations within the 128-bit AES core computation unit for encryption and decryption respectively.
Figure 4B:
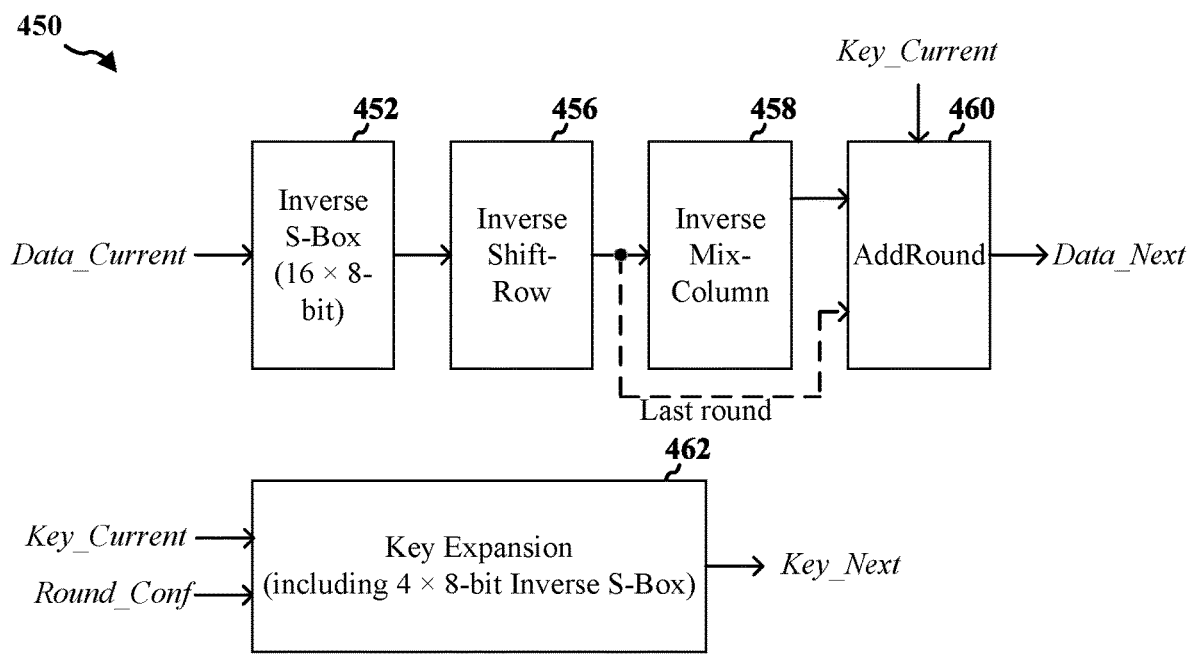

FIGS. 4A and 4B depict an example of the main operations within the 128-bit AES core computation unit for encryption and decryption respectively. In one embodiment, the AES core computation unit 400 or 450 may be the AES core computation unit 304 described above in FIG. 3. The encryption and decryption are similar in operation except the encryption needs S-Box, Shift-Row, Mix-Column, whereas the decryption needs inverse S-Box, inverse Shift-Row, and inverse Mix-Column.

FIG. 4A depicts an example of the main operations within the 128-bit AES core computation unit for encryption. In one embodiment, the AES core computation unit 400 may include S-Box 402, Shift-Row 406, Mix-Column 408, AddRound 410, and Key Expansion 412. The S-Box 402 may take some number of input bits, m, and transforms them into some number of output bits, n, where n is not necessarily equal to m (for a parallel implementation, m=n). The Shift-Row 406 may perform shift row transformation, which shifts the bytes in each row of a matrix by a certain offset, determined by the encryption algorithm. The Mix-Column 408 may perform matrix multiplication. The AddRound 410 may perform XOR operations. The Key Expansion 412 may include four 8-bit S-Boxes and expand a password key into a number of separate round keys.

The main inputs of the AES core computation unit 400 are the data of the current round (Data_Current), the password key of the current round (Key_Current), and the round configuration (Round_Conf). The data of the current round (Data_Current) may be provided to the S-Box 402, and the password key of the current round (Key_Current), and the round configuration (Round_Conf) may be provided to the Key Expansion 412. The main outputs of the AES core computation unit 400 are the encrypted immediate output (Data_Next) and the updated password key (Key_Next). The encrypted immediate output (Data_Next) may be provided by the AddRound 410, and the updated password key (Key_Next) may be provided by the Key Expansion 412. The outputs, Data_Next and Key_Next, of the current round are passed back to be the inputs, Data_Current and Key_Current, of the next round, respectively. For the last round of computation, the operation of Mix-Column 408 is not computed.

FIG. 4B depicts an example of the main operations within the 128-bit AES core computation unit for decryption. In one embodiment, the AES core computation unit 450 may include inverse S-Box 452, inverse Shift-Row 456, inverse Mix-Column 458, AddRound 460, and Key Expansion 462. The inverse S-Box 452 may be the S-Box 402 run in reverse. The inverse Shift-Row 456 may perform the inverse of the Shift-Row 406. The inverse Mix-Column 458 may perform the inverse of the Mix-Column 408. The AddRound 460 may perform XOR operations. The Key Expansion 462 may include four 8-bit inverse S-Boxes and expand a password key into a number of separate round keys.

The main inputs of the AES core computation unit 450 are the data of the current round (Data_Current), the password key of the current round (Key_Current), and the round configuration (Round_Conf). The data of the current round (Data_Current) may be provided to the inverse S-Box 452, and the password key of the current round (Key_Current), and the round configuration (Round_Conf) may be provided to the Key Expansion 462. The main outputs of the AES core computation unit 450 are the decrypted immediate output (Data_Next) and the updated password key (Key_Next). The decrypted immediate output (Data_Next) may be provided by the AddRound 460, and the updated password key (Key_Next) may be provided by the Key Expansion 462. The outputs, Data_Next and Key_Next, of the current round are passed back to be the inputs, Data_Current and Key_Current, of the next round, respectively. For the last round of computation, the operation of inverse Mix-Column 458 is not computed.

Figure 5:
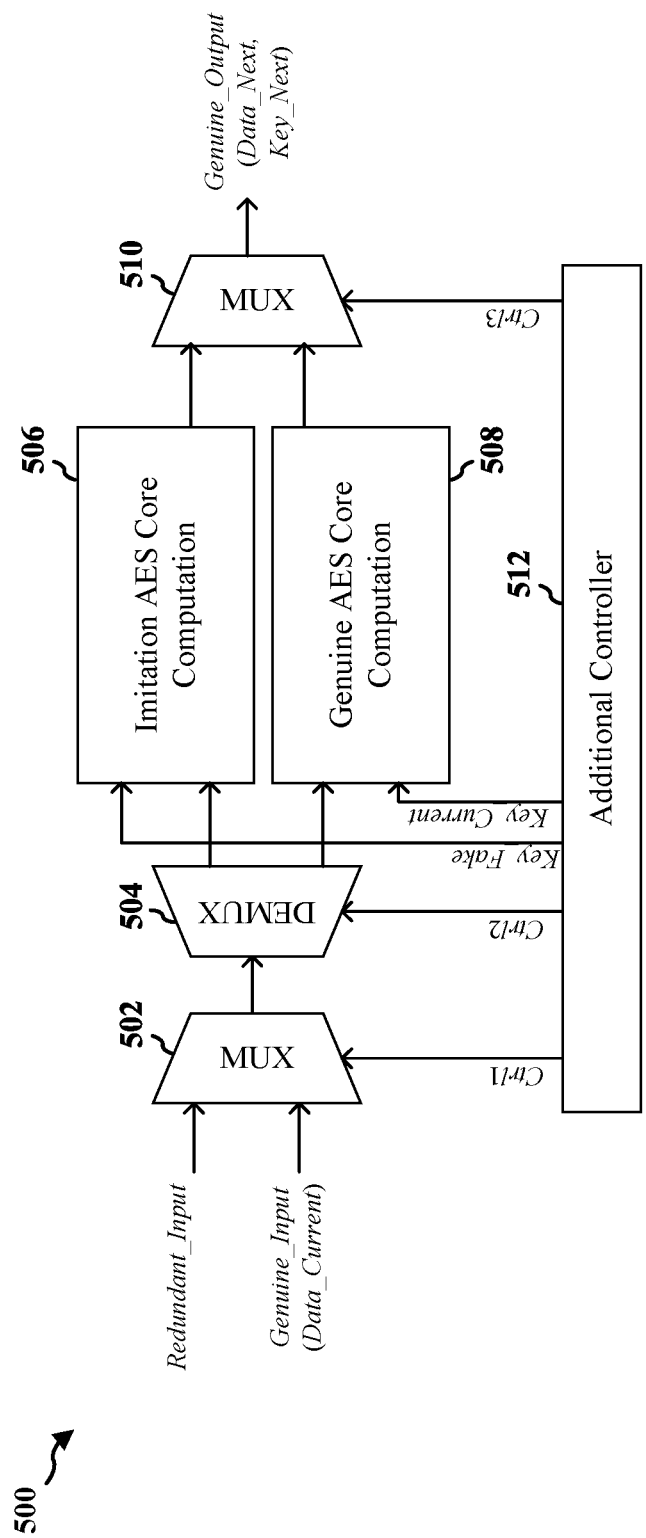
FIG. 5 depicts an example hardware architecture for the AES core computation in accordance with some embodiments of the disclosure.

Having illustrated the operations of an AES encryption, FIG. 5 depicts an example hardware architecture 500 for the AES core computation in accordance with some embodiments of the disclosure. The main input signals include Genuine_Input and Redundant_Input and the output signal is Genuine_Output; other synchronization signals are not shown. The Genuine_Input signal represents Data_Current as the plaintext (or cipher-text) or the immediate data signals within each round of computation. The Redundant_Input signal represents either the fake input (independent to the plaintext/cipher-text) or the plaintext/cipher-text itself. The multiplexer 502 chooses either the Genuine_Input signal or the Redundant_Input signal based on a control signal Ctrl1, followed by the de-multiplexer 504 for passing the input to the genuine AES core computation block 508 or the imitation AES core computation block 506 based on a control signal Ctrl2. The genuine AES core computation block 508 generates the wanted output based on the password key (Key_Current) and the data (Data_Current), whereas the imitation AES core computation block 506 generates a fake output based on a fake key (Key_Fake) and/or the Redundant_Input signal.

The genuine AES computation block 508 and the imitation AES computation block 506 may be executed at the different time (e.g. delayed by one clock cycle), and the sequence of their computation may be random. The additional controller 512 synchronizes the input signals and controls the sequence of the computation, e.g., by providing control signals Ctrl1, Ctrl2, Ctrl3. The additional controller 512 may further provide the password key (Key_Current) to the genuine AES core computation block 508 and provide the fake key (Key_Fake) to the imitation AES core computation block 506. The multiplexer 510 selects the outputs from the genuine AES core computation block 508 and the imitation AES core computation block 506 based on the control signal Ctrl3 to output the Genuine_Output signal. In some embodiments, the Genuine_Output signal may include Data_Next and Key_Next signals generated by the genuine AES core computation block 508.

Figure 6:
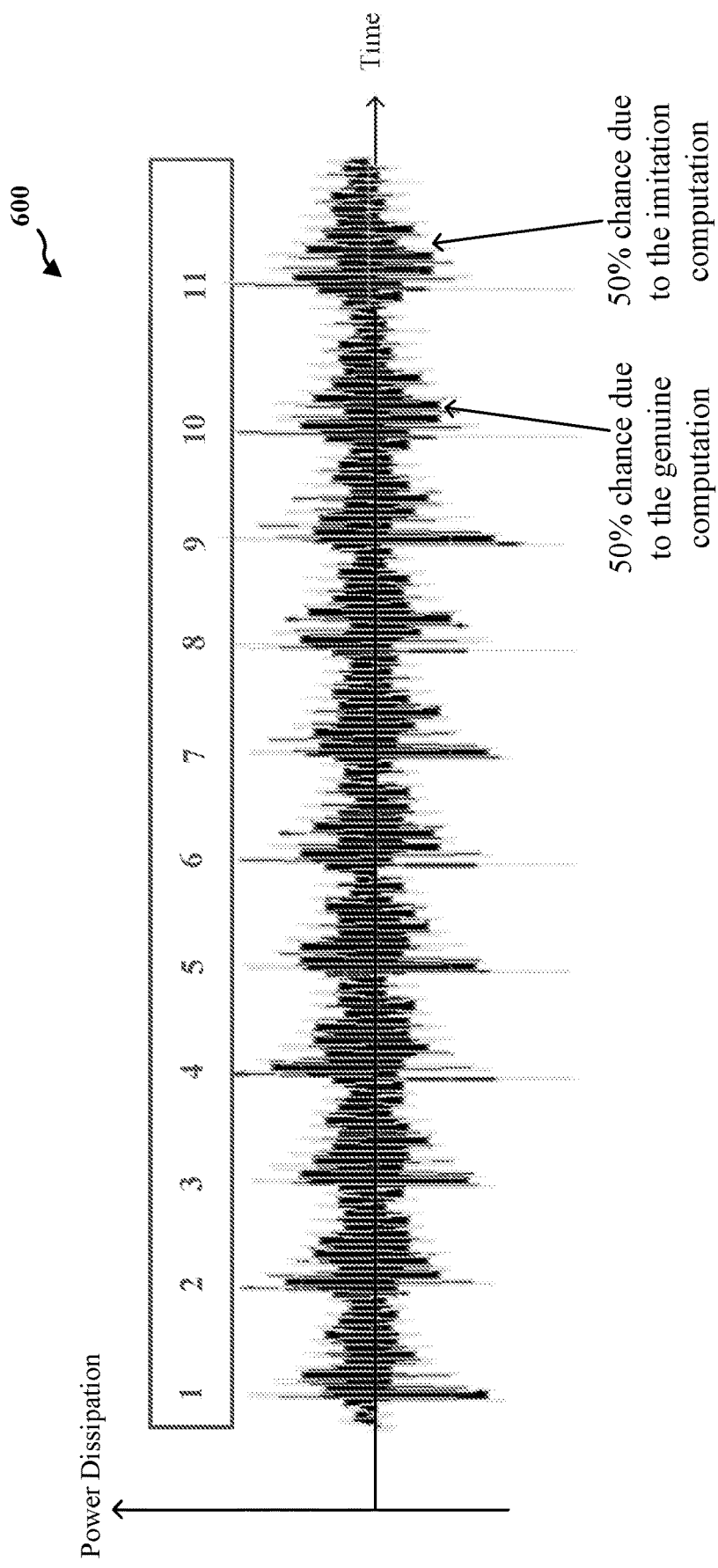
FIG. 6 depicts an example of the power dissipation profile for executing AES using the hardware architecture in accordance with one embodiment of the disclosure.

FIG. 6 depicts an example of the power dissipation profile 600 for executing AES using the hardware architecture in accordance with one embodiment of the disclosure. Instead of showing 10 rounds of operations (as in FIG. 1), FIG. 6 shows the power profile 600 for 11 rounds—original 10 rounds of genuine operation and an additional round of imitation operation. In this case, the imitation operation is inserted in either the 10th round or the 11th round, having equal probability of 50% (or almost equal) in each round. The power dissipations of the genuine operation and the imitation operation are similar. Similarly, the other leakage information such as the electromagnetic emissions of the genuine operation and the imitation operation are similar. As a result, the adversary needs to distinguish the genuine operation and the imitation operation, and re-synchronize these operations before doing SCAs, including CPA and CEMA.

Figures 7A, 7B, 7C:
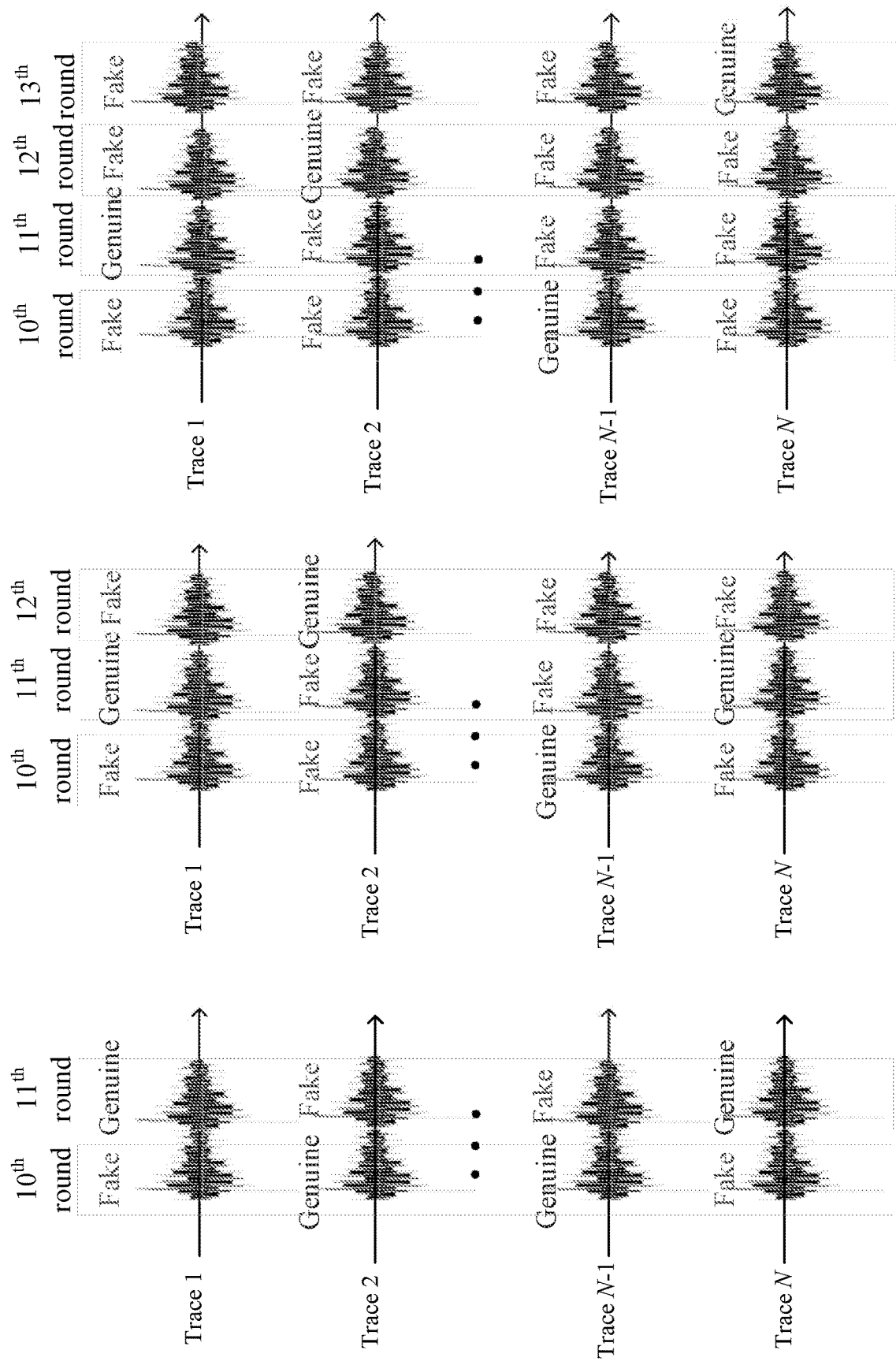
FIGS. 7A-7C depict examples of the power dissipation profiles of hardware architecture of embodiment with one imitation, two imitations and three imitations, respectively.

FIGS. 7A-7C depicts examples of the power dissipation profiles of hardware architecture of embodiments with one imitation, two imitations, and three imitations, respectively. Since the (fake) imitations are inserted, the CPA attack does not work by merely collecting the measurement traces in any one of the rounds. For example, in FIG. 7A, 50% of the measurement traces contain fake operations, increasing the CPA-resistance where the direct CPA would likely fail. In FIG. 7B, about ⅔ of the measurement traces contain fake operations, hence the direct CPA would be more likely to fail. In FIG. 7C, about ¼ of the measurement traces contain fake operations, hence the direct CPA would be almost impossible. Although the re-alignment of these measurement traces is possible in order to re-align only the genuine traces in one round, the possibility to achieve that is too small. As evaluated earlier with reference to FIG. 2, the effective measurement traces and the time required are exponentially large even just for a small number of N.

Figure 8:
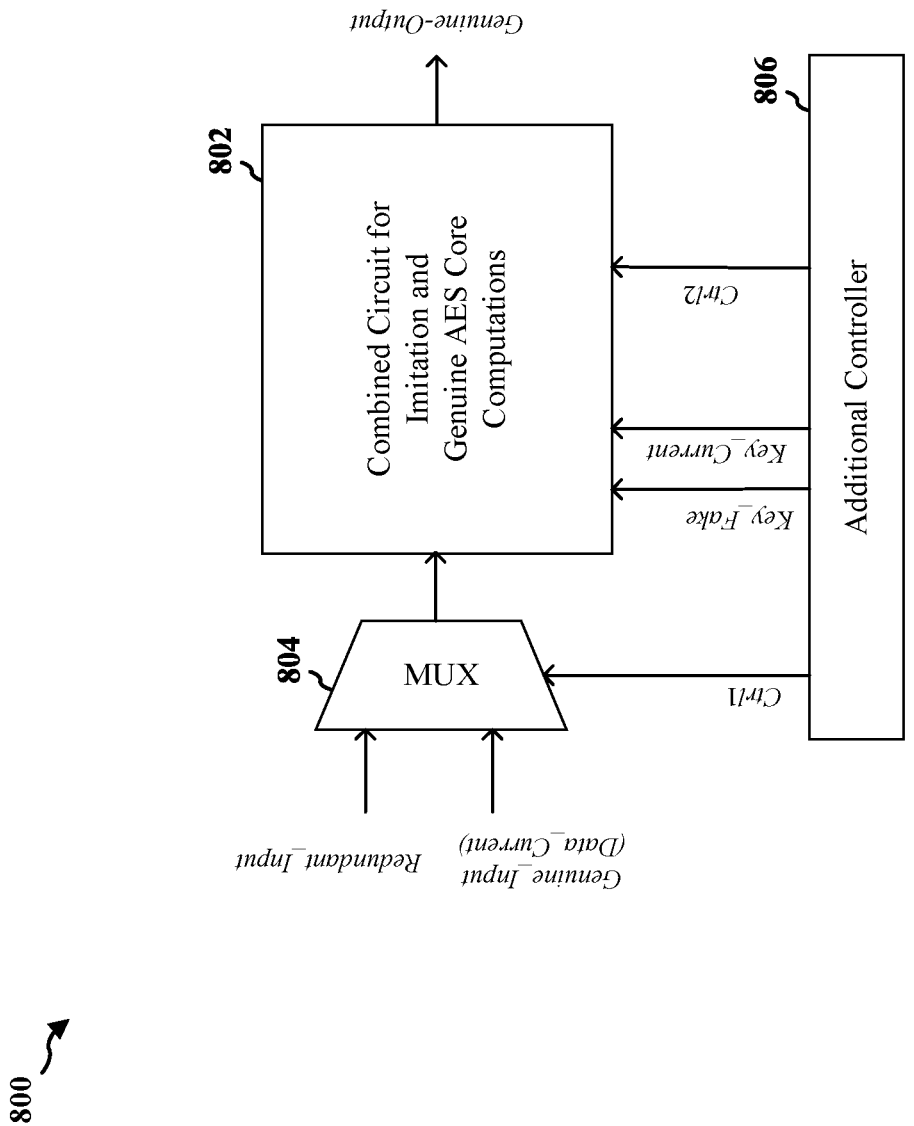
FIG. 8 depicts another example of hardware architecture in accordance with one embodiment of the disclosure.

FIG. 8 depicts another example of hardware architecture 800 in accordance with one embodiment of the disclosure. In FIG. 8, only one computational block 802 is used to generate either the genuine operation or the imitation operation. The main input signals include Genuine_Input and Redundant_Input and the output signal is Genuine Output; other synchronization signals are not shown. The Genuine_Input signal represents Data_Current as the plaintext (or cipher-text) or the immediate data signals within each round of computation. The Redundant_Input signal represents either the fake input (independent to the plaintext/cipher-text) or the plaintext/cipher-text itself. The multiplexer 804 chooses either the Genuine_Input signal or the Redundant_Input signal based on a control signal Ctrl1. Based on a control signal Ctrl2, the computational block 802 either generates the wanted output based on the password key (Key_Current) and the data (Data_Current), or generates a fake output based on a fake key (Key_Fake) and/or the Redundant_Input signal. The additional controller 806 is used to control these operations, and selects the correct output to form the Genuine_Output signal, e.g., by providing control signals Ctrl1, Ctrl2. The additional controller 512 may further provide the password key (Key_Current) and the fake key (Key_Fake) to the computational block 802. The hardware architecture 800 in FIG. 8 achieves the same effect as the hardware architecture 500 described above in FIG. 5.

To minimize the risks that the adversary could detect or predict the imitation and genuine computations, the Redundant_Input signal may embody some signal properties similar to the Genuine_Input signal. Similarly, the Key_Fake signal may embody some signal properties similar to the Key_Current signal. The idea is to achieve the similar electrical characteristics (e.g. power dissipation or electromagnetic emissions) between the imitation and genuine computations. One possible implementation is to make the Redundant_Input signal having the same Hamming weight (HW) as the Genuine_Input or to make the Key_Fake signal having the same HW as the Key_Current signal.

Figure 9:
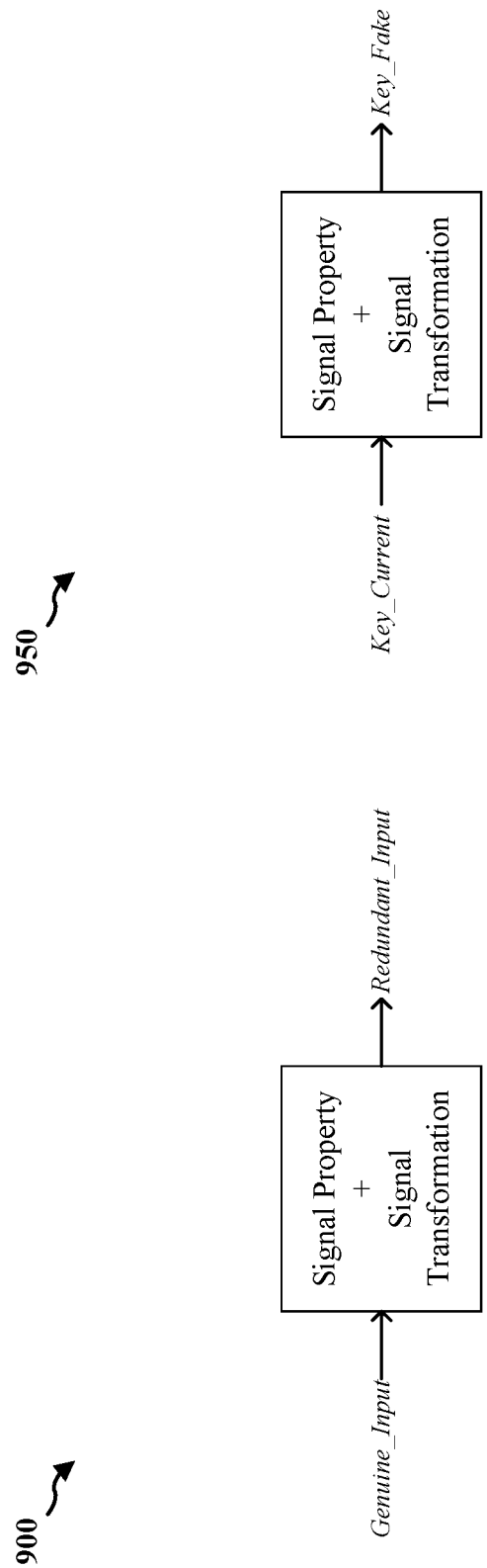
FIGS. 9A and 9B are diagrams depicting how the redundant input (Redundant_Input) and fake key (Key_Fake) signals can be derived based on the genuine input (Genuine_Input) and password key (Key_Current) signals, respectively.

FIGS. 9A and 9B are diagrams 900 and 950 depicting how the redundant input (Redundant_Input) and fake key (Key_Fake) signals can be derived based on the genuine input (Genuine_Input) and password key (Key_Current) signals, respectively. As shown in FIG. 9A, the Redundant_Input signal may be derived by embodying some signal properties similar to the Genuine_Input signal. Similarly, as shown in FIG. 9B, the Key_Fake signal may be derived by embodying some signal properties similar to the Key_Current signal.

Figure 10:
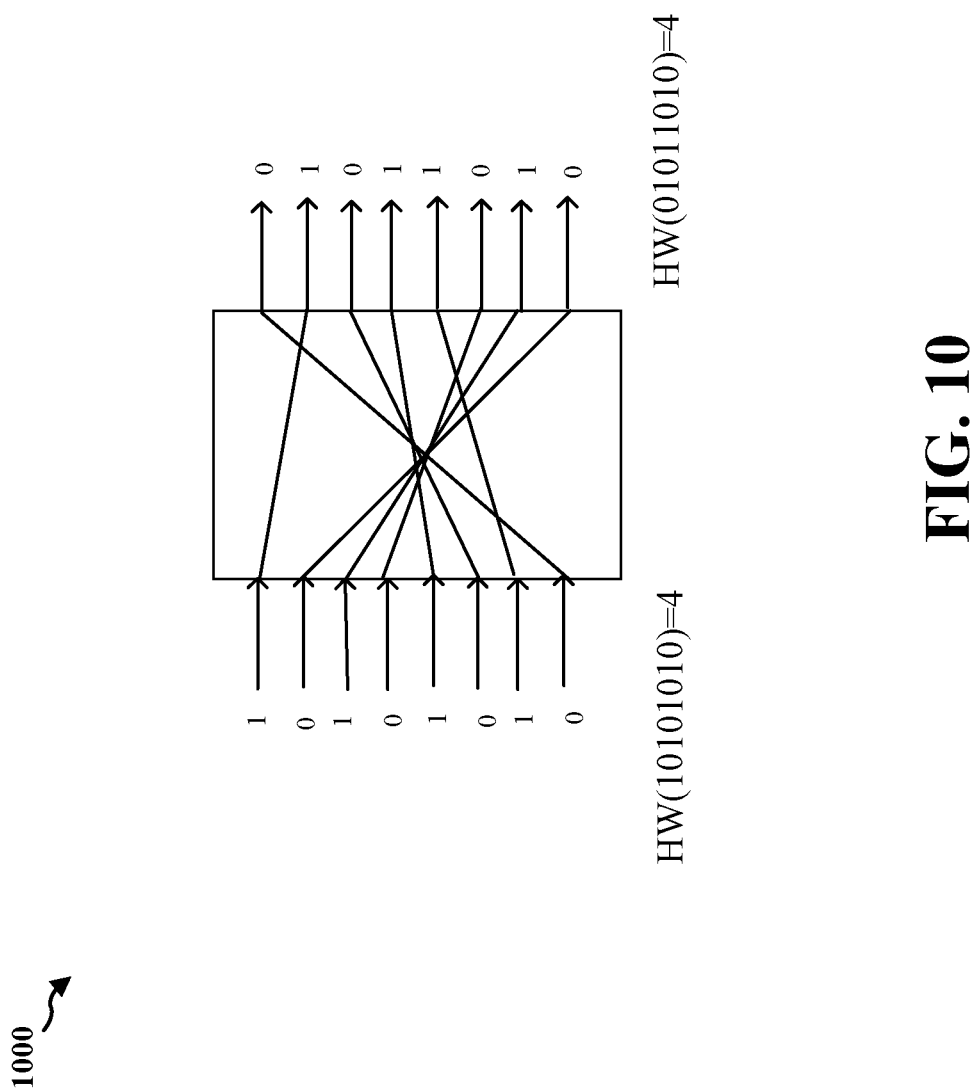
FIG. 10 is a diagram depicting an implementation example by scrambling the signal (either a genuine input or a password key).

FIG. 10 is a diagram 1000 depicting an implementation example by scrambling the signal (either a genuine input or a password key). In FIG. 10, the input string 10101010 having an HW of 4 can be scrambled to another output string 01011010 having the same HW of 4. The HW is calculated by counting the number of non-zero bit in the bit string. Since the Redundant_Input signal or the Key_Fake signal has the same signal properties (in this case the HW) as the Genuine_Input or Key_Current, the imitation computation (in each round) would have very similar electrical characteristics to the genuine computation (in each round). Besides the HW model, the signal properties can be other models such as Hamming distance, zero model, etc.

Figure 11:
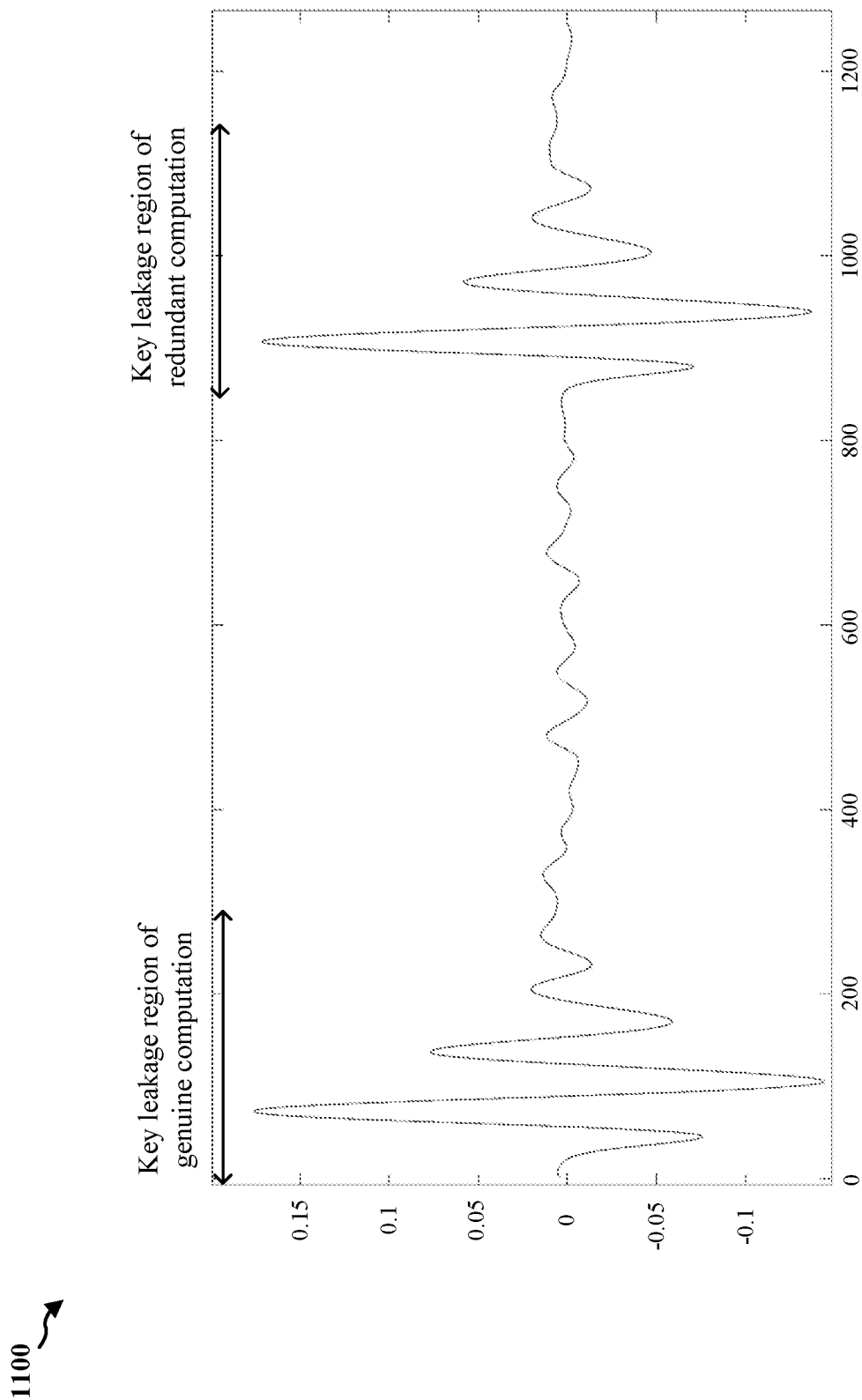
FIG. 11 is a chart showing the power dissipation of the genuine and imitation computations where their key leakage regions are emphasized.

FIG. 11 is a chart 1100 showing the power dissipation of the genuine and imitation computations where their key leakage regions are emphasized. In some embodiments, the key leakage region is the region of the emitted analog characteristics caused by the operations where the password key could be leaked. In some embodiments, the key leakage region is the region of the emitted analog characteristics caused by the operations that involve the password key. The higher the degree of similarity between the power dissipation of the genuine and imitation computations (within the key leakage region) is, the better the security feature for the computing device.

Figure 12A:
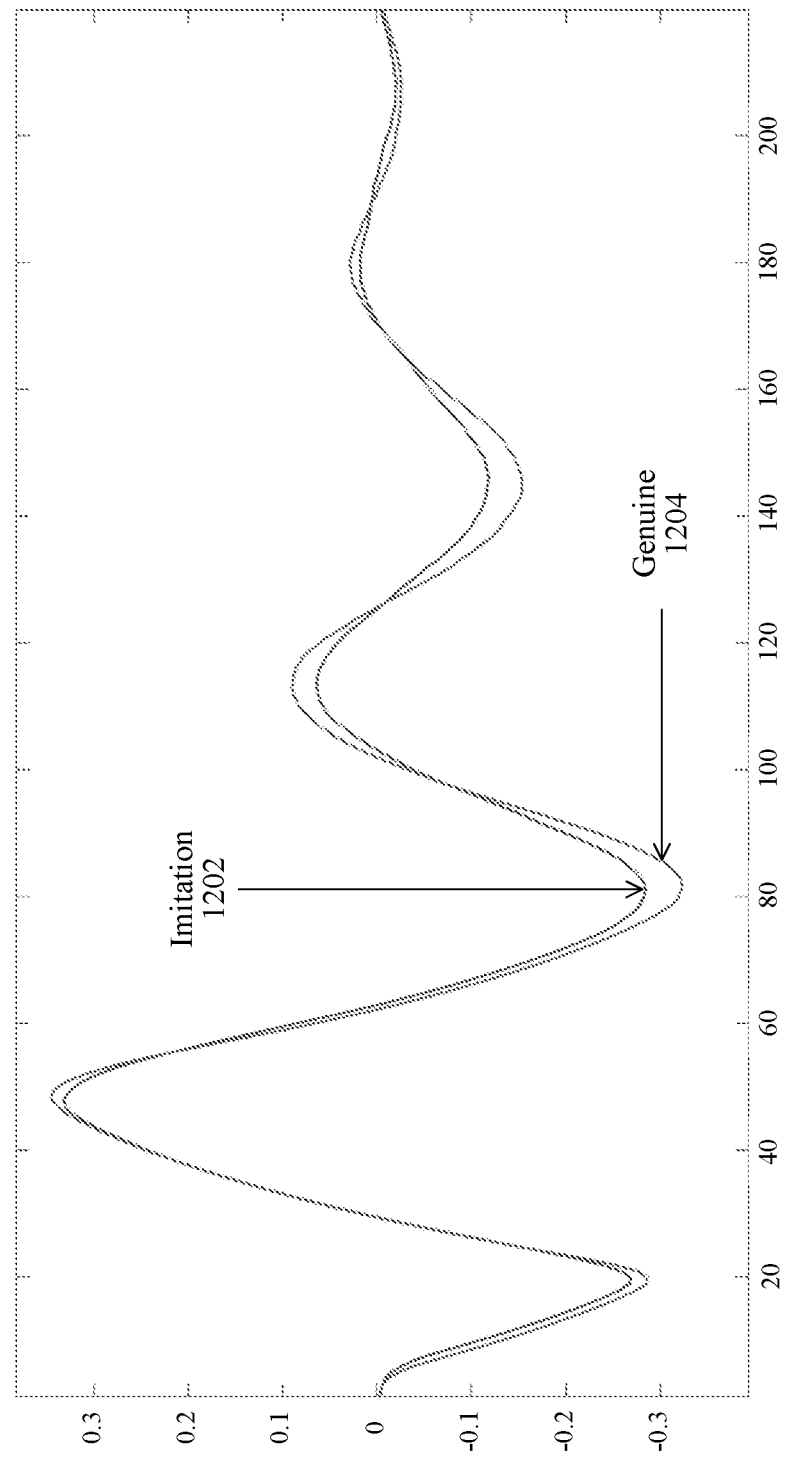
FIGS. 12A-12C are diagrams illustrating examples of quantifying the similarity of the key leakage regions of the analog characteristics of the genuine and imitation computations.
Figure 12B:
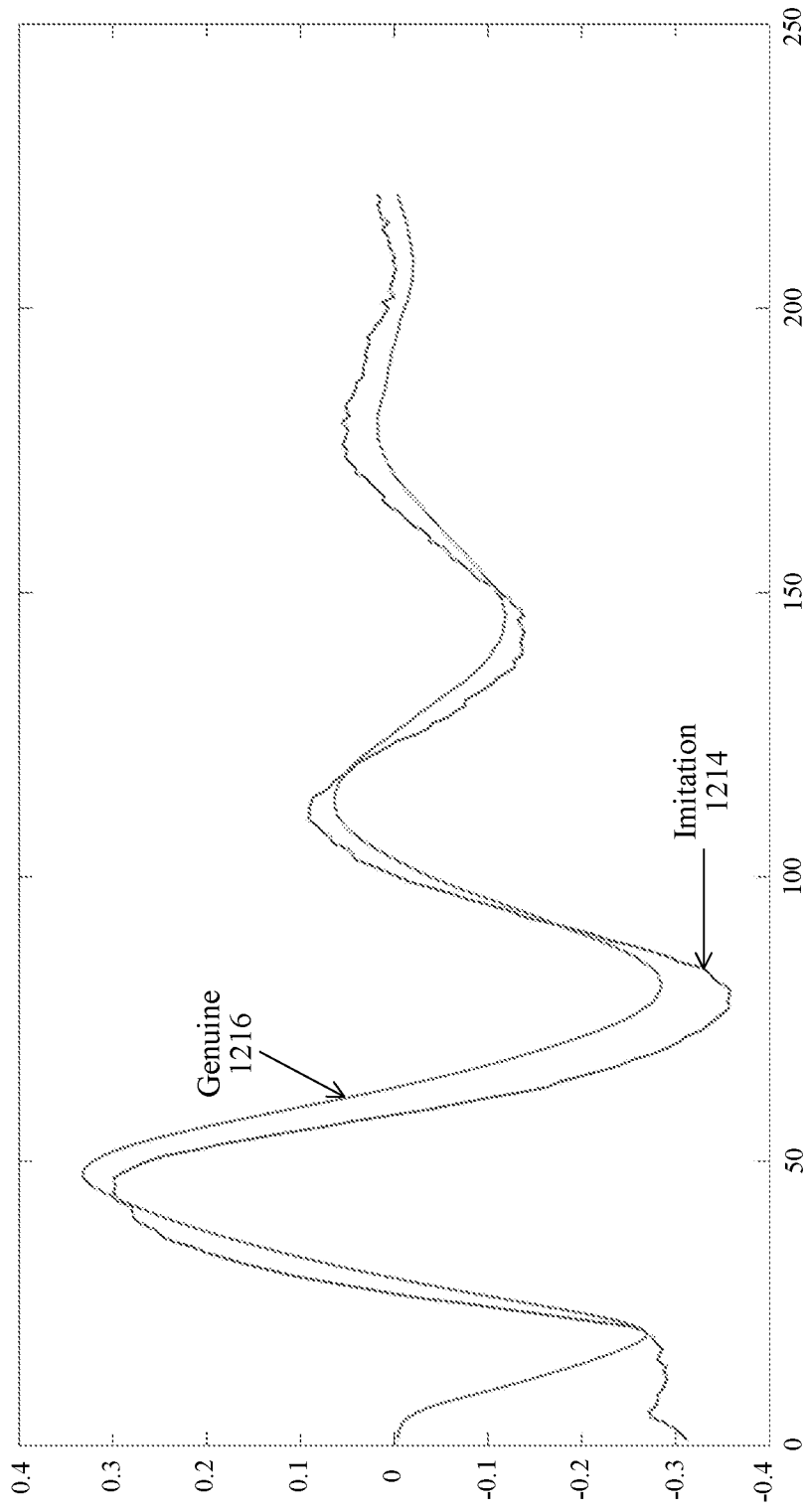
Figure 12C:
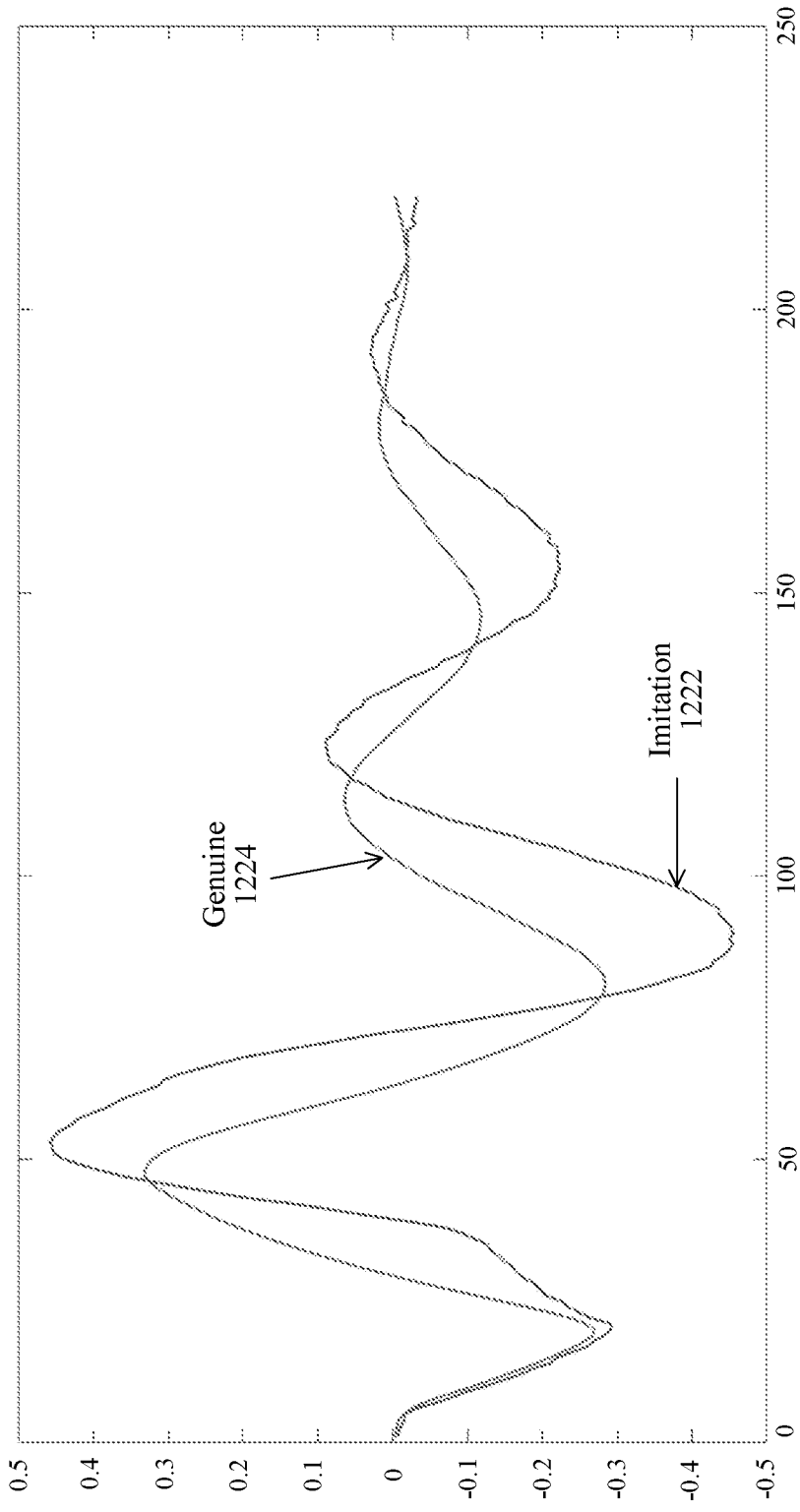

FIGS. 12A-12C are diagrams 1200, 1210, 1220 illustrating examples of quantifying the similarity of the key leakage regions of the analog characteristics of the genuine and imitation computations. In each of the diagrams 1200, 1210, 1220, there are two sets of power dissipation profiles, where one set of power dissipation profile corresponds to a genuine computation and the other set of power dissipation profile corresponds to an imitation computation. For example, the diagram 1200 in FIG. 12A illustrates power dissipation profiles 1202 and 1204. The power dissipation profile 1204 corresponds to a genuine computation and the power dissipation profile 1202 corresponds to an imitation computation. The diagram 1210 in FIG. 12B illustrates power dissipation profiles 1214 and 1216. The power dissipation profile 1216 corresponds to a genuine computation and the power dissipation profile 1214 corresponds to an imitation computation. The diagram 1220 in FIG. 12C illustrates power dissipation profiles 1222 and 1224. The power dissipation profile 1224 corresponds to a genuine computation and the power dissipation profile 1222 corresponds to an imitation computation.

By visual inspection, the genuine and imitation computations in FIG. 12A have the highest similarity, followed by that in FIG. 12B, and the lowest in that of FIG. 12C. Mathematically, the Normalized Absolute Difference (NAD) as defined in equation (2) and/or the correlation coefficient (e.g., as defined in equation (1)) may be used to quantify the similarity between the analog electrical characteristics of the genuine and imitation computations. The correlation coefficient assumes values in the range from −1 to +1, where +1 indicates the highest possible similarity, 0 is the lowest possible similarity, and −1 the highest possible similarity but in opposite direction of one plot to another.

$$\text{Normalized\_Absolute\_Difference} = \frac{\text{Average}(|\text{genuine\_computation}|) - \text{Average}(|\text{imitation\_computation}|)}{\text{Average}(|\text{genuine\_computation}|) + \text{Average}(|\text{imitation\_computation}|)} \quad (2)$$

Applying the mathematical metrics to the two sets of power dissipation profiles in FIG. 12A, the two sets of power dissipation profiles are highly similar (almost identical), as their NAD is almost 0 and their correlation coefficient is almost 1. In FIG. 12B, the two sets of power dissipation profiles are similar, as their NAD is about 0.1 and their correlation coefficient is about 0.84. In FIG. 12C, the two sets of power dissipation profiles are not that similar, as their NAD is greater than 0.2 and their correlation coefficient is less than 0.74. In some embodiments, the analog characteristics of the computations are similar if their NAD is less than or equal to 0.2. In some embodiments, the analog characteristics of the computations are similar if their correlation coefficient is greater than or equal to 0.8.

Figure 13A:
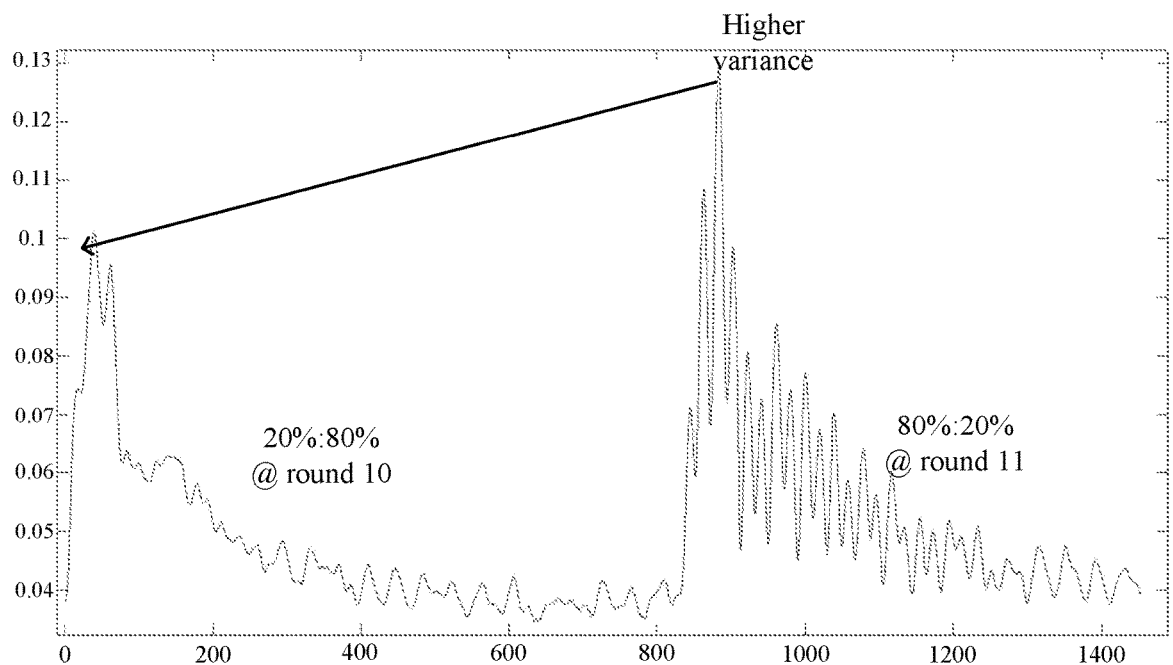
FIGS. 13A-13F show examples of the variance analysis for different occurrence distributions for genuine and imitation AES core computations in the round 10 (former part) and 11 (latter part).
Figure 13B:
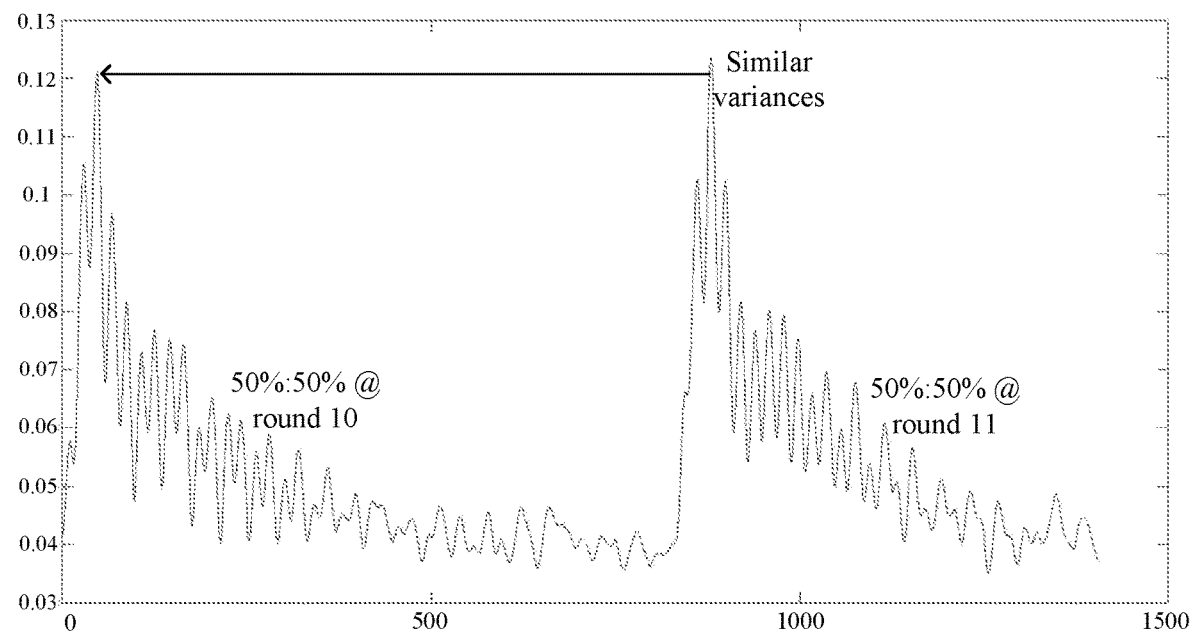
Figure 13C:
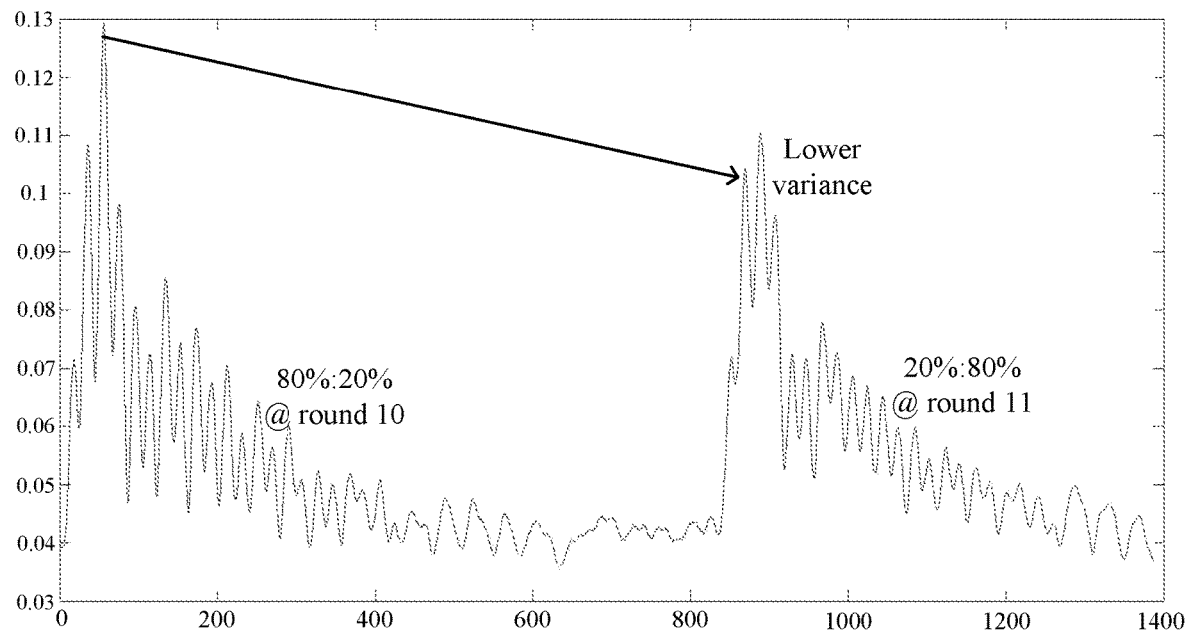
Figure 13D:
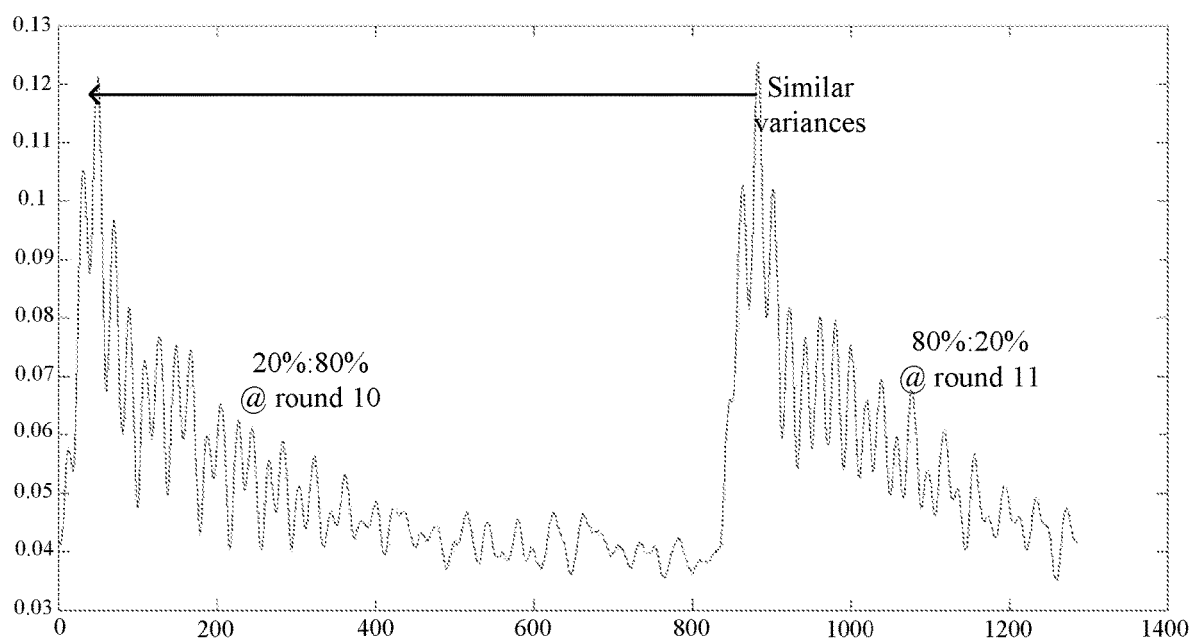
Figure 13E:
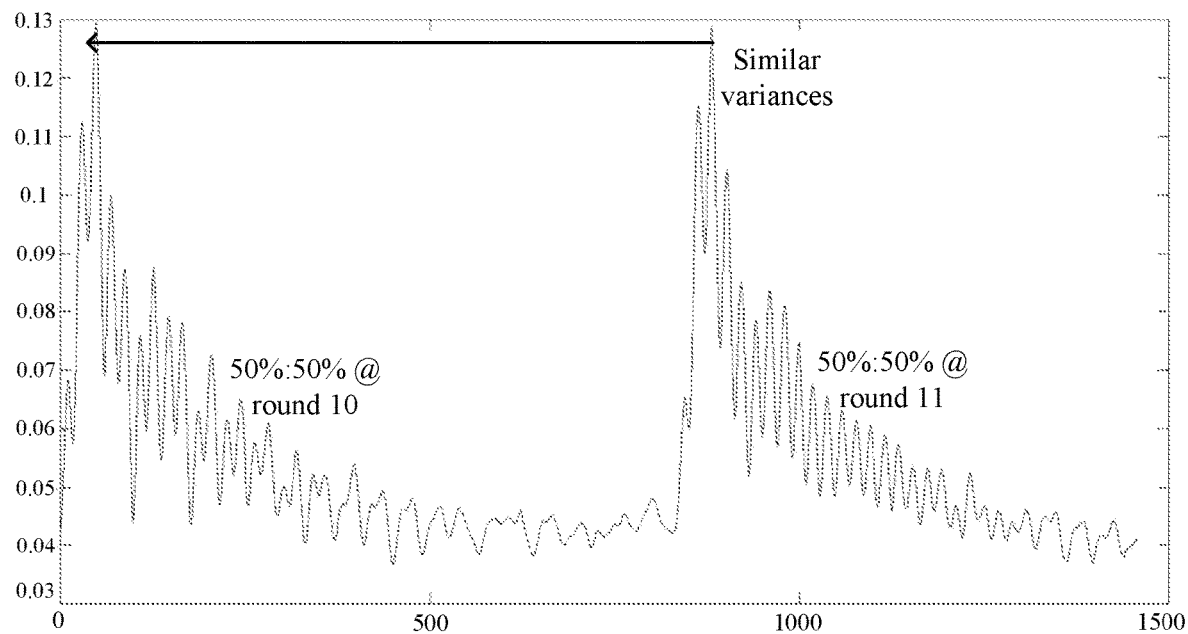
Figure 13F:
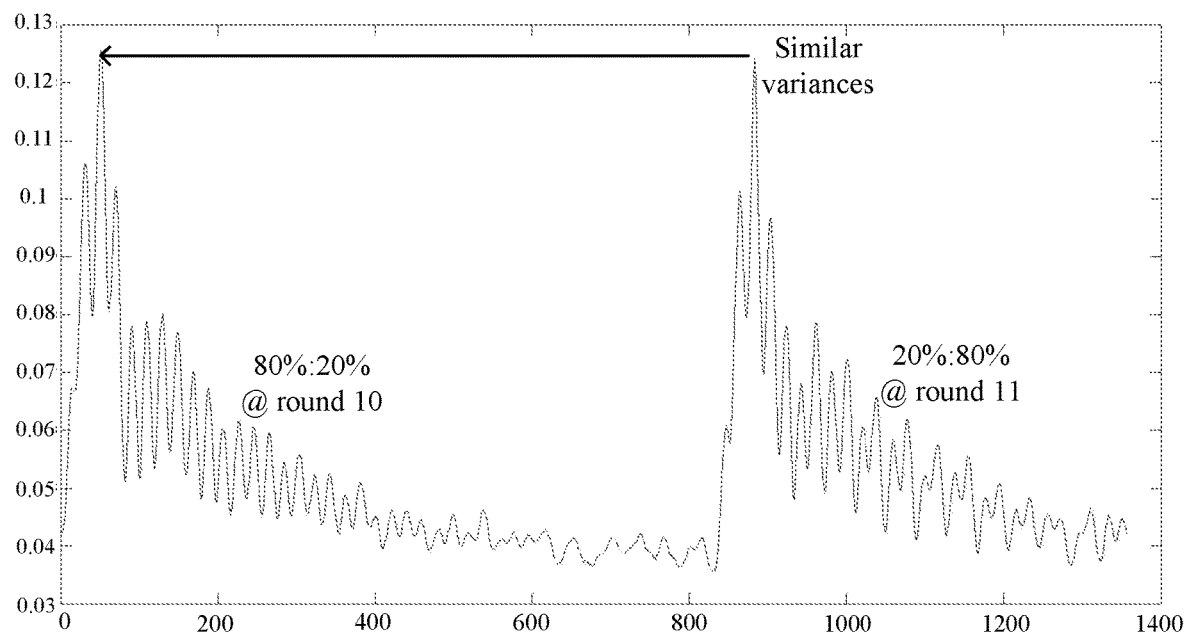

FIGS. 13A-13F show examples of the variance analysis for different occurrence distributions for genuine and imitation AES core computations in the round 10 (former part) and 11 (latter part). The occurrence distributions difference (%) between genuine and imitation AES core computations are labeled in each round in the figures. In FIG. 13A, the occurrence distribution ratio between the genuine and imitation AES core computations is 20%:80% at round 10 and 80%:20 at round 11. In FIG. 13B, the occurrence distribution ratio between the genuine and imitation AES core computations is 50%:50% at rounds 10 and 11. In FIG. 13C, the occurrence distribution ratio between the genuine and imitation AES core computations is 80%:20% at round 10 and 20%:80% at round 11. In FIG. 13D, the occurrence distribution ratio between the genuine and imitation AES core computations is 20%:80% at round 10 and 80%:20 at round 11. In FIG. 13E, the occurrence distribution ratio between the genuine and imitation AES core computations is 50%:50% at rounds 10 and 11. In FIG. 13F, the occurrence distribution ratio between the genuine and imitation AES core computations is 80%:20% at round 10 and 20%:80% at round 11.

FIGS. 13A-13C depict the variance analysis where the redundant input signal is different from the genuine input signal, and the redundant input signal has different Hamming weight from the genuine input signal. FIGS. 13D-13F depict the variance analysis where the redundant input signal now has the same Hamming weight as the genuine input signal.

From FIGS. 13A-13C, when a different HW is used, the variance analysis can help to indicate the occurrence distributions between genuine and imitation computations. For example in FIG. 13A, the higher variance in the round 11 means that the round 11 has more genuine computations. This is because the imitation computations can be considered as noises that likely have the lower variances. Since the round 10 has more imitation computations, the variance will be lower. In FIG. 13B, when the occurrence distribution is the same due to their random inputs at rounds 10 and 11, their variance is similar. Although the difference in the variances can be observed in FIGS. 13A and 13C, it does not imply that the adversary can easily distinguish the genuine and imitation computations (within the same round). The brute-force method (i.e., by trial and error) within the same round to try to find the genuine computation would be ineffective as the search space remains very large for a large N.

From FIGS. 13D-13F, when the same HW is used, all rounds have very similar variances, meaning that the imitation computations have highly similar electrical characteristics to the genuine computations. This means that although the imitation computations are considered redundant computations, they have similar analog characteristics to the genuine computations. In other words, it is highly difficult to distinguish the imitation and genuine computations. The brute-force method (i.e., by trial and error) within the same round and different rounds attempt to find the genuine computations would be even more ineffective as the search space is too large, even for a small N.

In some embodiments, the similarity for two sets of measurements (e.g., power dissipation) where each set has many measurements, mixing with genuine and imitation computations may be quantified. In such embodiments, the variance of the measurements may be correlated. For example, the correlation coefficient of the variance for the data in FIGS. 13B, 13D, 13E and 13F are quite high (e.g., greater than 0.95). Whereas, the correlation coefficient of the variance for the data in FIGS. 13A and 13C are marginally high (e.g., less than 0.8). In some embodiments, when the variance of the measurement profiles for different rounds (e.g. 10th and 11th rounds) is correlated, the measurement profiles may be considered to be similar if the correlation coefficient of the variance is at least greater than or equal to 0.8.

Figure 14A:
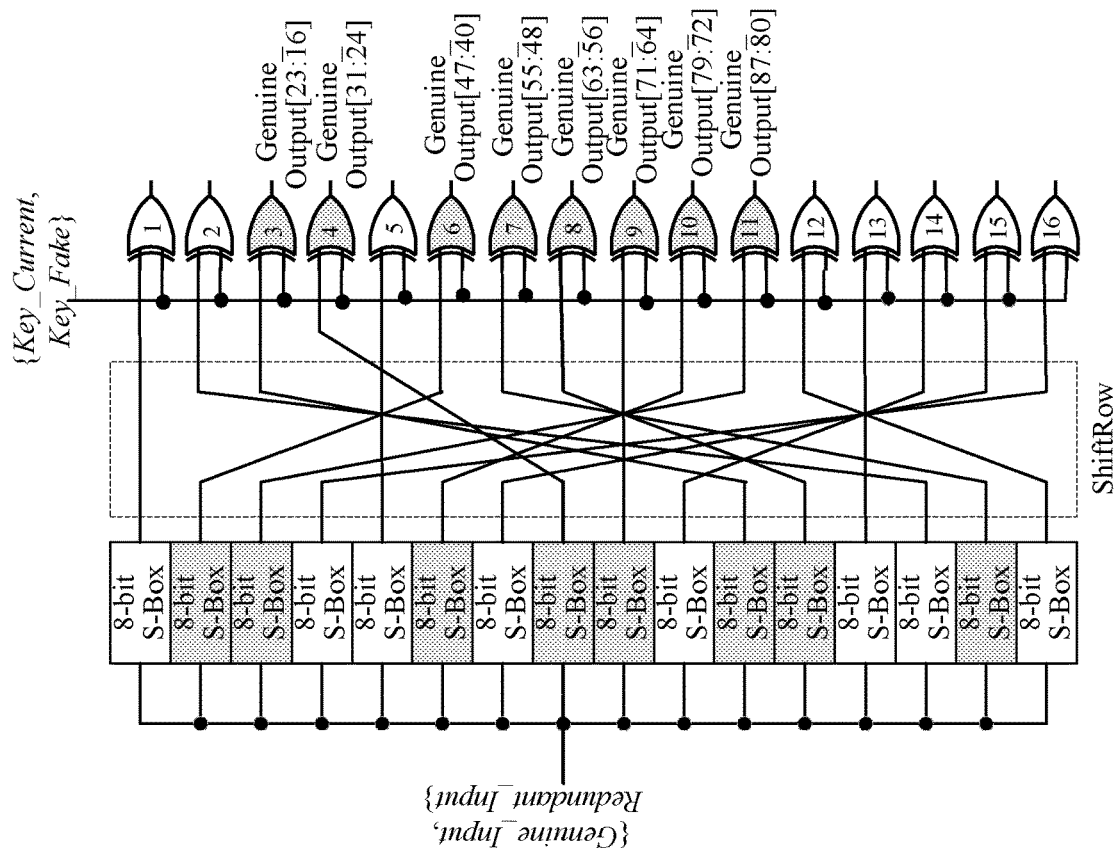
FIGS. 14A and 14B depict two operations for the last round computation.
Figure 14B:
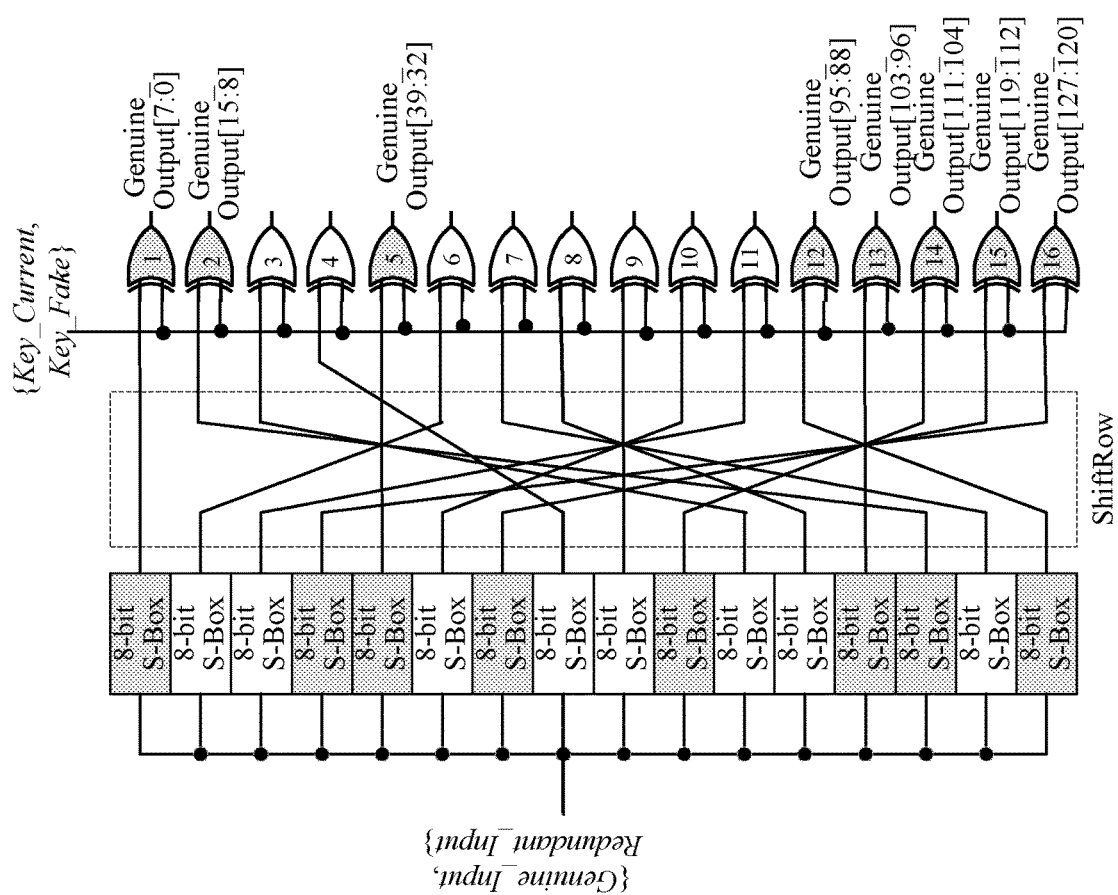

The genuine computation and computational imitation may be further intermixed to collectively generate both the genuine output and the redundant data. In this case, both computations are partially useful, and contains partial results; none of the computation is redundant. FIGS. 14A and 14B depict two operations for the last round computation. The last round computation may have 128-bit S-Box, Shift-Row, and AddRound. In FIG. 14A, only the first half of the input data and the first half of the key are genuine; the rest of the data and key are fake but have similar analog characteristics. Half of the S-Box circuits and XOR gates (shaded in gray) perform the first part of the genuine last round computation. In FIG. 14B, the second half of the input and the second half of the key are genuine; the rest of the data and key are fake but have similar analog characteristics. The second half of the S-Box circuits and XOR gates (shaded in gray) perform the second part of the genuine last round computation. Collectively, all the genuine outputs are combined. The selection of the S-Box circuits and their corresponding XOR circuits can be random for every last round operation, increasing the difficulty to predict the sequence/location of genuine operations.

Figure 15:
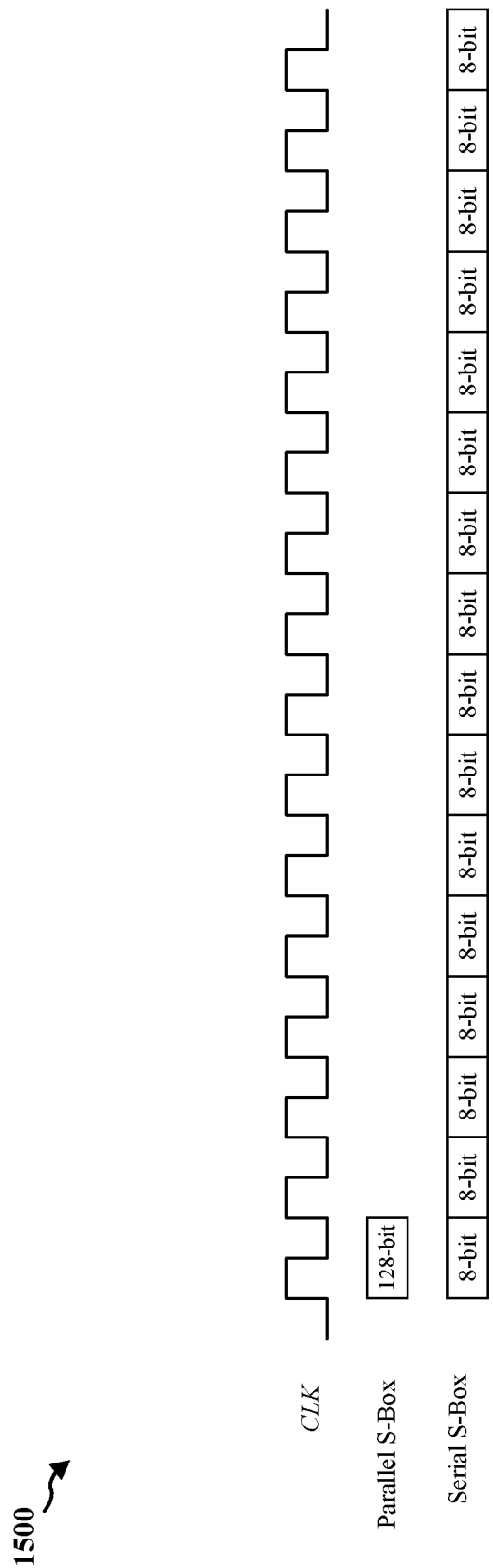
FIG. 15 is a diagram depicting the waveform where the 128-bit S-Box operations can be computed.

The hardware architecture for each round within AES can be further implemented differently but yet embodying the disclosed embodiments. For example, the main operations of the AES consist of S-Box operations. FIG. 15 is a diagram 1500 depicting the waveform where the 128-bit S-Box operations can be computed. In one embodiment, the S-Box operation can be computed within 1 clock by using parallel S-Box computations having 16 sets of 8-bit S-Box circuit. The 8-bit S-Box circuit is the smallest building block by substituting 256 ($2^8$) inputs to another 256 outputs. Alternatively, the S-Box operations can be computed serially over 16 clock cycles where each clock cycle produces 8-bit output. This serial approach is advantageous for small area implementation, as only one 8-bit S-Box circuit is needed. Such serial implementation is termed for tiny AES or nano AES.

Figure 16:
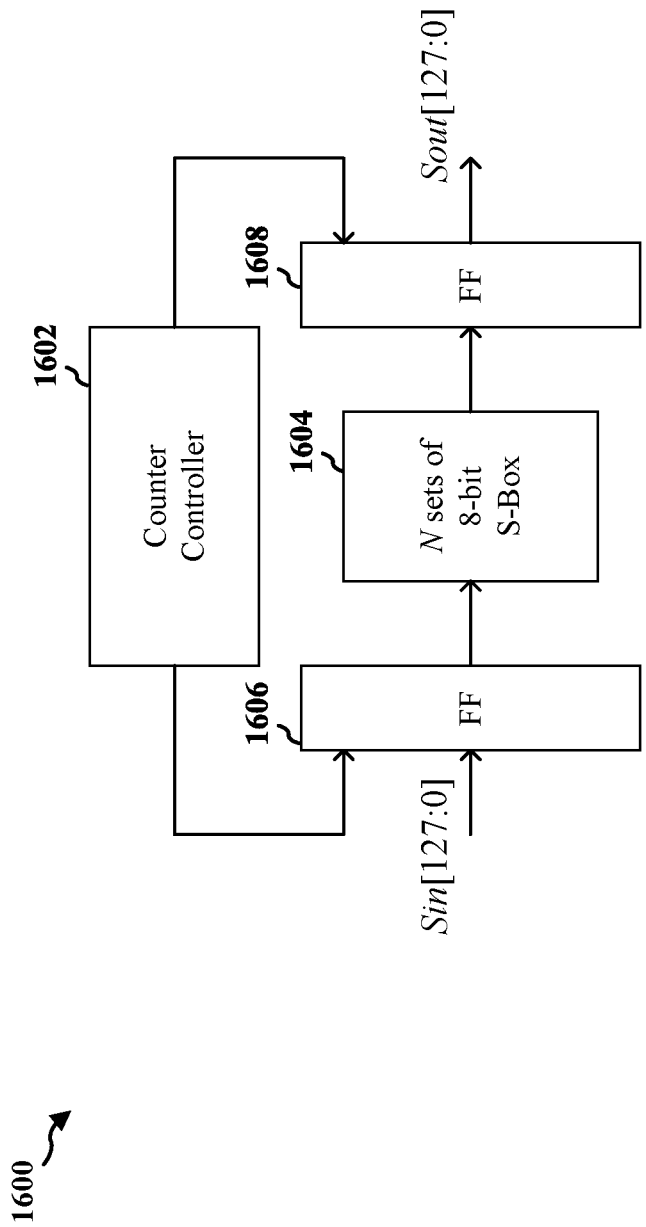
FIG. 16 depicts an example of a serial architecture for serializing the S-Box operations.

FIG. 16 depicts an example of a serial architecture 1600 for serializing the S-Box operations. In the example, the inputs are Sin[127:0] and the corresponding outputs are Sout[127:0]. Instead of having 128-bit S-Box operations simultaneously (within each round), the S-Box operations are serialized having multiple iterations of S-Box operations (within each round). For example, each iteration of S-Box operation can perform an 8-bit S-Box operation (i.e., computed by one 8-bit S-Box circuit) or a 16-bit S-Box operation (i.e., computed by two 8-bit S-Box circuits) or a 32-bit S-Box operation (i.e., computed by four 8-bit S-Box circuits) or a 64-bit operation (i.e., computed by eight 8-bit S-Box circuits). The iterations of S-Box operations are controlled by an embedded counter controller 1602, by synchronizing the inputs (via input registers 1606) to the S-Box circuits 1604 and by synchronizing the outputs (via output registers 1608) to the Shift Row operations. Should a small gate count requirement be considered (e.g., for a nano AES), the output registers can be optional where Sout[127:0] can be indirectly feedback (via combinational logic) to the input registers. An imitation of the iteration of S-Box operation can be inserted within each round of 128-bit S-Box operation.

FIGS. 17A-17D depict examples of the iteration operation sequence to compute all 128-bit S-Box operations where an imitation iteration of S-Box operation is inserted. Specifically, FIGS. 17A-17D depict the scenarios where each iteration operation takes 8-bit, 16-bit, 32-bit, and 64-bit S-Box operations, respectively. For illustration, the imitation iteration of S-Box operation is inserted at the beginning. A person of ordinary skill in the art would recognize that the imitation iteration of S-Box operation may be inserted in any sequence, and the position of the insertion may be different from time to time (e.g., round to round). Further, the 128-bit Sin[127:0] may be multiplexed arbitrarily to each iteration of S-Box operation. Using FIG. 17A as an example for illustration, the 1st 8-bit S-Box can take the 8 most-significant-bit (Sin[127:120]) for one round, and thereafter take the 8 least-significant-bit (Sin[7:0]) in another round. Similarly, for other scenarios in FIG. 17B-17D, the S-Box circuits 1604 take different bit-string from round to round. Such randomization, together with the imitation operation, make the adversary difficult to correlate the power/electromagnetic emission profile during the SCA. The synchronization of the randomization (and the imitation operation) is handled by the counter controller 1602, by randomizing the inputs for each iteration of operations and finally re-ordering the outputs for proper subsequent operation (i.e., Shift-Row operation).

Figure 18:
FIG. 18 is a diagram depicting an example of the sequence of the iterations of S-Box operations for two traces.

The 128-bit Sin[127:0] may be multiplexed arbitrarily to each iteration of S-Box operation. This arbitrary multiplexing may be referred to as bit-string randomization. In some embodiments, the computational imitation may be skipped. FIG. 18 is a diagram 1800 depicting an example of the sequence of the iterations of S-Box operations for two traces. In the example, the iteration operation sequence for 128-bit S-Box operation (with only one S-Box circuit) for two encryption processes is provided. In process 1802, the iterations of 8-bit S-Box operations are performed in a normal order. In process 1804, the iterations of 8-bit S-Box operations are performed randomly. For each iteration of S-Box operation, the electrical characteristics (power or electromagnetic emission) may be very similar.

Figure 19:
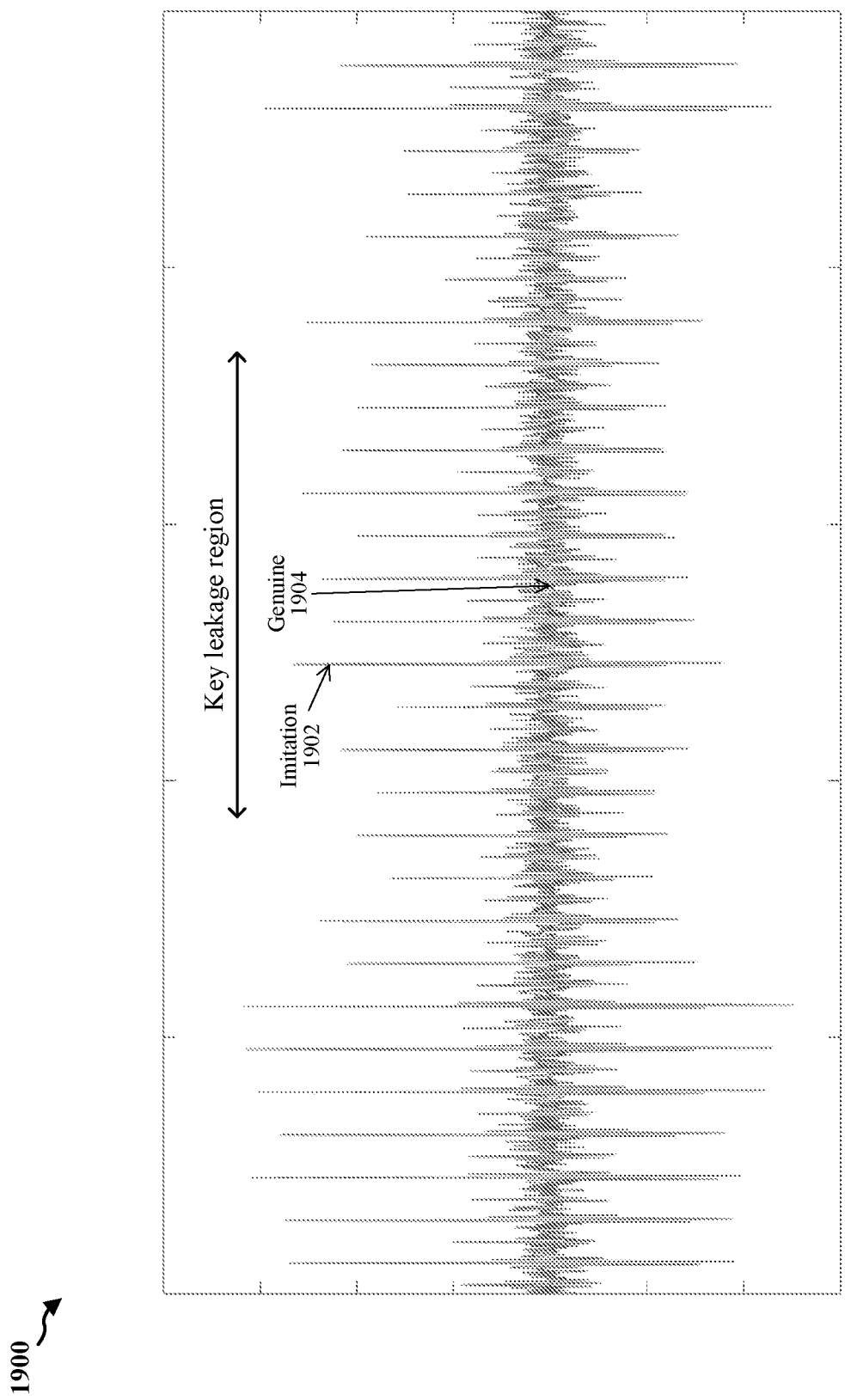
FIG. 19 is a diagram depicting an example of the waveform for two electromagnetic emission measurements (genuine and imitation) where the key leakage feature occurs over multiple clock cycles.

For serial architecture design, the key leakage region may be spread over multiple clock cycles. FIG. 19 is a diagram 1900 depicting an example of the waveform for two electromagnetic emission measurements 1904 and 1902 (genuine computation and imitation computation, respectively) where the key leakage feature occurs over multiple clock cycles. For such a scenario, the correlation of the variance of the electromagnetic emission measurements may be evaluated to measure similarity. In the example, the correlation of the variance is greater than 0.95. In some embodiments, when the variance of the electromagnetic emission measurements for different rounds is correlated, the electromagnetic emission measurements for different rounds are considered to be similar if the correlation coefficient of the variance is at least greater than or equal to 0.8.

It should be clear that a person skilled in the art can easily apply the disclosed embodiments to counteract SCAs based on the primary conceptual idea that at least one redundant or partial redundant operation is generated in a random sequence and the redundant or partial redundant operation and the genuine operation have similar leakage information (e.g. power dissipation profile, electromagnetic emission, faulty timing, or others).

It should also be clear that a person skilled in the art can easily apply the disclosed embodiments to design any secured hardware, with any programming means (e.g. microcontroller programming and firmware) or hardware means (e.g., FPGA, ASIC) without deviating from the conceptual idea that at least one redundant or partial redundant operation is generated in a random sequence and the redundant or partial redundant operation and the genuine operation have similar leakage information (e.g., power dissipation profile, electromagnetic emission, faulty timing, or others).

It should also be clear that a person skilled in the art can easily apply the disclosed embodiments to design any secured hardware, with any modifications including the change of hardware architecture (with integrated circuits or separate circuits) without deviating from the conceptual idea that at least one redundant or partial redundant operation is generated in a random sequence and the redundant or partial redundant operation and the genuine operation have similar leakage information (e.g., power dissipation profile, electromagnetic emission, faulty timing, or others).

It should also be clear that a person skilled in the art can easily apply the disclosed embodiments to design any secured hardware with any cryptographic algorithms (e.g. AES, DES, etc.) embedded without deviating from the conceptual idea that at least one redundant or partial redundant operation is generated in a random sequence and the redundant or partial redundant operation and the genuine operation have similar leakage information (e.g., power dissipation profile, electromagnetic emission, faulty timing or others).

It should also be clear that a person skilled in the art can easily apply the disclosed embodiments to design any secured hardware, with any modifications to generate the redundant input or fake password key signals by leveraging the signal properties of the genuine input and/or password key signals, without deviating from the conceptual idea that at least one redundant or partial redundant operation is generated in a random sequence and the redundant or partial redundant operation and the genuine operation have similar leakage information (e.g., power dissipation profile, electromagnetic emission, faulty timing, or others).

It should further be clear that a person skilled in the art could easily apply the invention to design any secured hardware, with any modifications by changing the sequence of the iterations of operations where these iterations of operations have similar leakage information (e.g., power dissipation profile, electromagnetic emission, faulty timing, or others).

Figure 20:
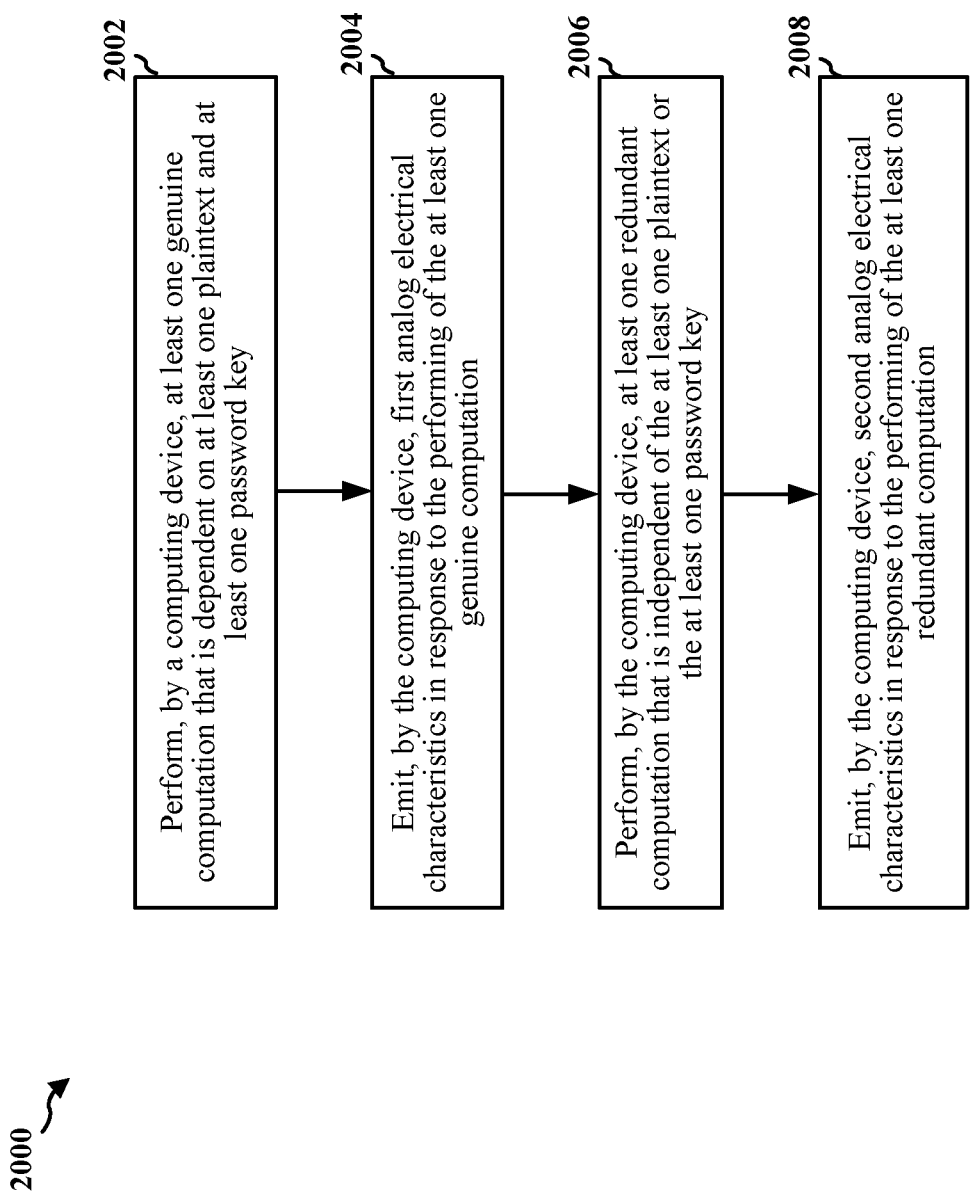
FIG. 20 is a flowchart of a method of encryption for enhanced hardware security.

FIG. 20 is a flowchart 2000 of a method of encryption for enhanced hardware security. In some embodiments, the method may be performed by an apparatus (e.g., the apparatus 2202/2202' shown in FIG. 22 or FIG. 23). At 2002, the apparatus may perform at least one genuine computation that is dependent on at least one plaintext and at least one password key. The at least one genuine computation collectively generates at least one cipher-text based on the at least one plaintext and the at least one password key.

At 2004, the apparatus may emit first analog electrical characteristics in response to the performing of the at least one genuine computation. In some embodiments, the first analog electrical characteristics may include at least one of power dissipation or electromagnetic emission.

At 2006, the apparatus may perform at least one redundant computation that is independent of the at least one plaintext or the at least one password key. In some embodiments, the at least one genuine computation includes at least one round of genuine computation, and the at least one redundant computation includes at least one round of computational imitation. The sequence of computations for the at least one round of genuine computation and the at least one round of computational imitation may be random. The at least one round of genuine computation collectively generates the at least one cipher-text.

In some embodiments, at least one round of computation may be performed to encrypt the at least one plaintext. The at least one round of computation includes at least two partial computations, each of which includes a portion of the at least one genuine computation and a portion of the at least one redundant computation. The at least two partial computations collectively generate the at least one cipher-text. In such embodiments, analog electrical characteristics emitted by the apparatus for each partial computation of the at least two partial computations are similar, and analog electrical characteristics emitted by the apparatus when a partial computation of the at least two partial computations is performed are similar to analog electrical characteristics emitted by the apparatus when the at least one round of computation is performed.

In some embodiments, at least one round of computation is performed to encrypt the at least one plaintext. The at least one round of computation includes at least one iteration of genuine substitution-box computation and at least one iteration of substitution-box computational imitation. The at least one genuine computation may include the at least one iteration of genuine substitution-box computation, and the at least one redundant computation may include the at least one iteration of substitution-box computational imitation. In such embodiments, the sequence of computations for the at least one iteration of genuine substitution-box computation and the at least one iteration of substitution-box computational imitation may be random. The at least one iteration of genuine substitution-box computation collectively generates the at least one cipher-text. The at least one iteration of substitution-box computational imitation may have similar analog electrical characteristics to the at least one iteration of genuine substitution-box computation.

At 2008, the apparatus may emit second analog electrical characteristics in response to the performing of the at least one redundant computation. The second analog electrical characteristics may resemble the first analog electrical characteristics. In some embodiments, in order for the second analog electrical characteristics to resemble the first analog electrical characteristics, a metric of similarity between the first analog electrical characteristics and the second analog electrical characteristics may satisfy a threshold. In some embodiments, the metric may be one of Normalized Absolute Difference, correlation coefficient, or correlation coefficient of variance. In some embodiments, the metric may be derived from key leakage regions of the first analog electrical characteristics and the second analog electrical characteristics. In some embodiments, the second analog electrical characteristics resemble the first analog electrical characteristics if the NAD between them is less than or equal to 0.2. In some embodiments, the second analog electrical characteristics resemble the first analog electrical characteristics if the correlation coefficient between them is greater than or equal to 0.8. In some embodiments, the second analog electrical characteristics resemble the first analog electrical characteristics if the correlation coefficient of the variance of them is greater than or equal to 0.8. In some embodiments, the second analog electrical characteristics may include at least one of power dissipation or electromagnetic emission.

In some embodiments, the at least one genuine computation may be performed based on at least one of a first input and a first key, the first input derived from the at least one plaintext and the first key derived from the at least one password key. The at least one redundant computation may be performed based on at least one of a second input or a second key. In some embodiments, the first input may have the same Hamming weight as the second input. In some embodiments, the first key may have the same Hamming weight as the second key.

Figure 21:
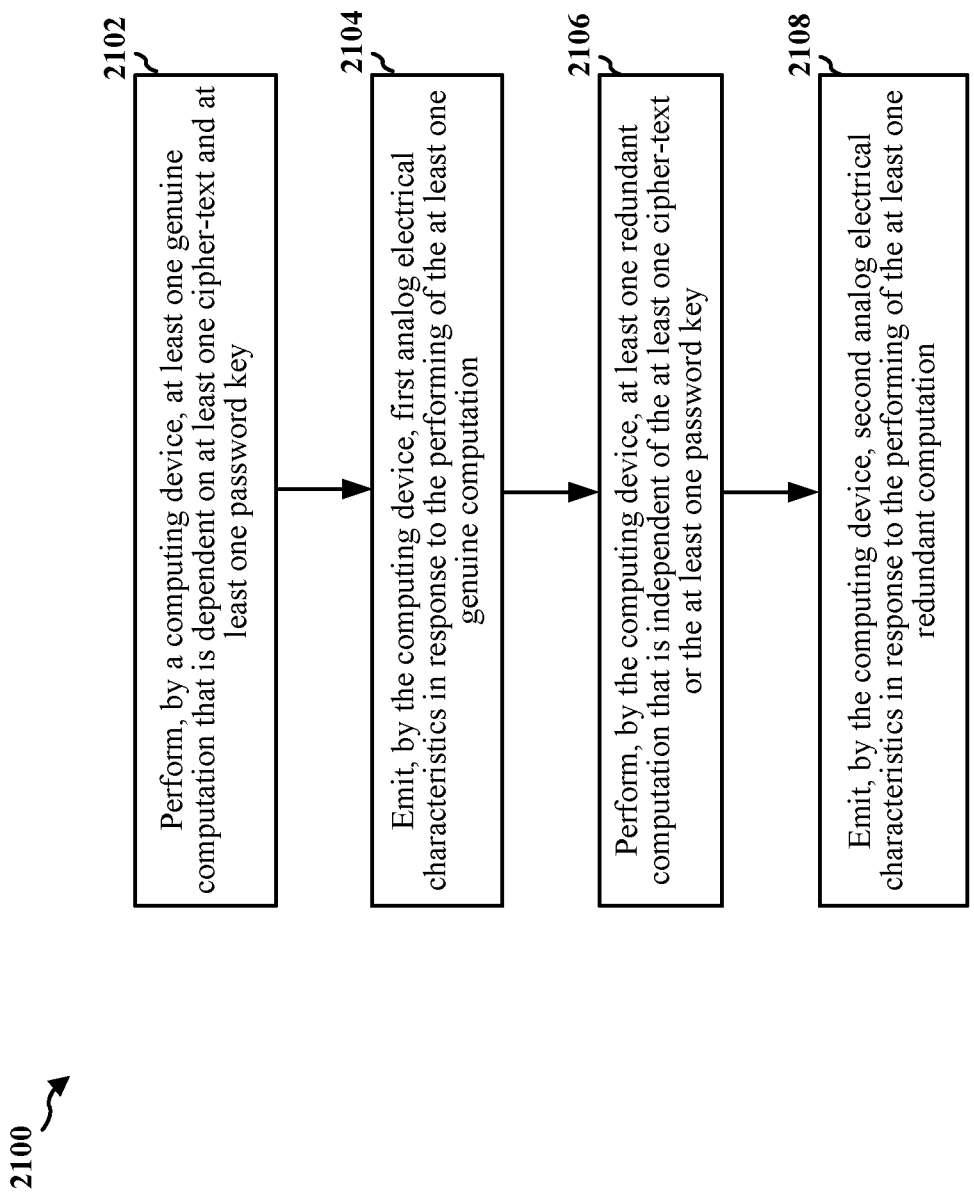
FIG. 21 is a flowchart of a method of decryption for enhanced hardware security.

FIG. 21 is a flowchart 2100 of a method of decryption for enhanced hardware security. In some embodiments, the method may be performed by an apparatus (e.g., the apparatus 2402/2402' shown in FIG. 24 or FIG. 25). At 2102, the apparatus may perform at least one genuine computation that is dependent on at least one cipher-text and at least one password key. The at least one genuine computation collectively generates at least one plaintext based on the at least one cipher-text and the at least one password key.

At 2104, the apparatus may emit first analog electrical characteristics in response to the performing of the at least one genuine computation. In some embodiments, the first analog electrical characteristics may include at least one of power dissipation or electromagnetic emission.

At 2106, the apparatus may perform at least one redundant computation that is independent of the at least one cipher-text or the at least one password key. In some embodiments, the at least one genuine computation includes at least one round of genuine computation, and the at least one redundant computation includes at least one round of computational imitation. The sequence of computations for the at least one round of genuine computation and the at least one round of computational imitation may be random. The at least one round of genuine computation collectively generates the at least one plaintext.

In some embodiments, at least one round of computation may be performed to decrypt the at least one cipher-text. The at least one round of computation includes at least two partial computations, each of which includes a portion of the at least one genuine computation and a portion of the at least one redundant computation. The at least two partial computations collectively generate the at least one plaintext. In such embodiments, analog electrical characteristics emitted by the apparatus for each partial computation of the at least two partial computations are similar, and analog electrical characteristics emitted by the apparatus when a partial computation of the at least two partial computations is performed are similar to analog electrical characteristics emitted by the apparatus when the at least one round of computation is performed.

In some embodiments, at least one round of computation is performed to decrypt the at least one cipher-text. The at least one round of computation includes at least one iteration of genuine inverse substitution-box computation and at least one iteration of inverse substitution-box computational imitation. The at least one genuine computation may include the at least one iteration of genuine inverse substitution-box computation, and the at least one redundant computation may include the at least one iteration of inverse substitution-box computational imitation. In such embodiments, the sequence of computations for the at least one iteration of genuine inverse substitution-box computation and the at least one iteration of inverse substitution-box computational imitation may be random. The at least one iteration of genuine inverse substitution-box computation collectively generates the at least one plaintext. The at least one iteration of inverse substitution-box computational imitation may have similar analog electrical characteristics to the at least one iteration of genuine inverse substitution-box computation.

At 2108, the apparatus may emit second analog electrical characteristics in response to the performing of the at least one redundant computation. The second analog electrical characteristics may resemble the first analog electrical characteristics. In some embodiments, in order for the second analog electrical characteristics to resemble the first analog electrical characteristics, a metric of similarity between the first analog electrical characteristics and the second analog electrical characteristics may satisfy a threshold. In some embodiments, the metric may be one of Normalized Absolute Difference, correlation coefficient, or correlation coefficient of variance. In some embodiments, the metric may be derived from key leakage regions of the first analog electrical characteristics and the second analog electrical characteristics. In some embodiments, the second analog electrical characteristics resemble the first analog electrical characteristics if the NAD between them is less than or equal to 0.2. In some embodiments, the second analog electrical characteristics resemble the first analog electrical characteristics if the correlation coefficient between them is greater than or equal to 0.8. In some embodiments, the second analog electrical characteristics resemble the first analog electrical characteristics if the correlation coefficient of the variance of them is greater than or equal to 0.8. In some embodiments, the second analog electrical characteristics may include at least one of power dissipation or electromagnetic emission.

In some embodiments, the at least one genuine computation may be performed based on at least one of a first input and a first key, the first input derived from the at least one cipher-text and the first key derived from the at least one password key. The at least one redundant computation may be performed based on at least one of a second input or a second key. In some embodiments, the first input may have the same Hamming weight as the second input. In some embodiments, the first key may have the same Hamming weight as the second key.

Figure 22:
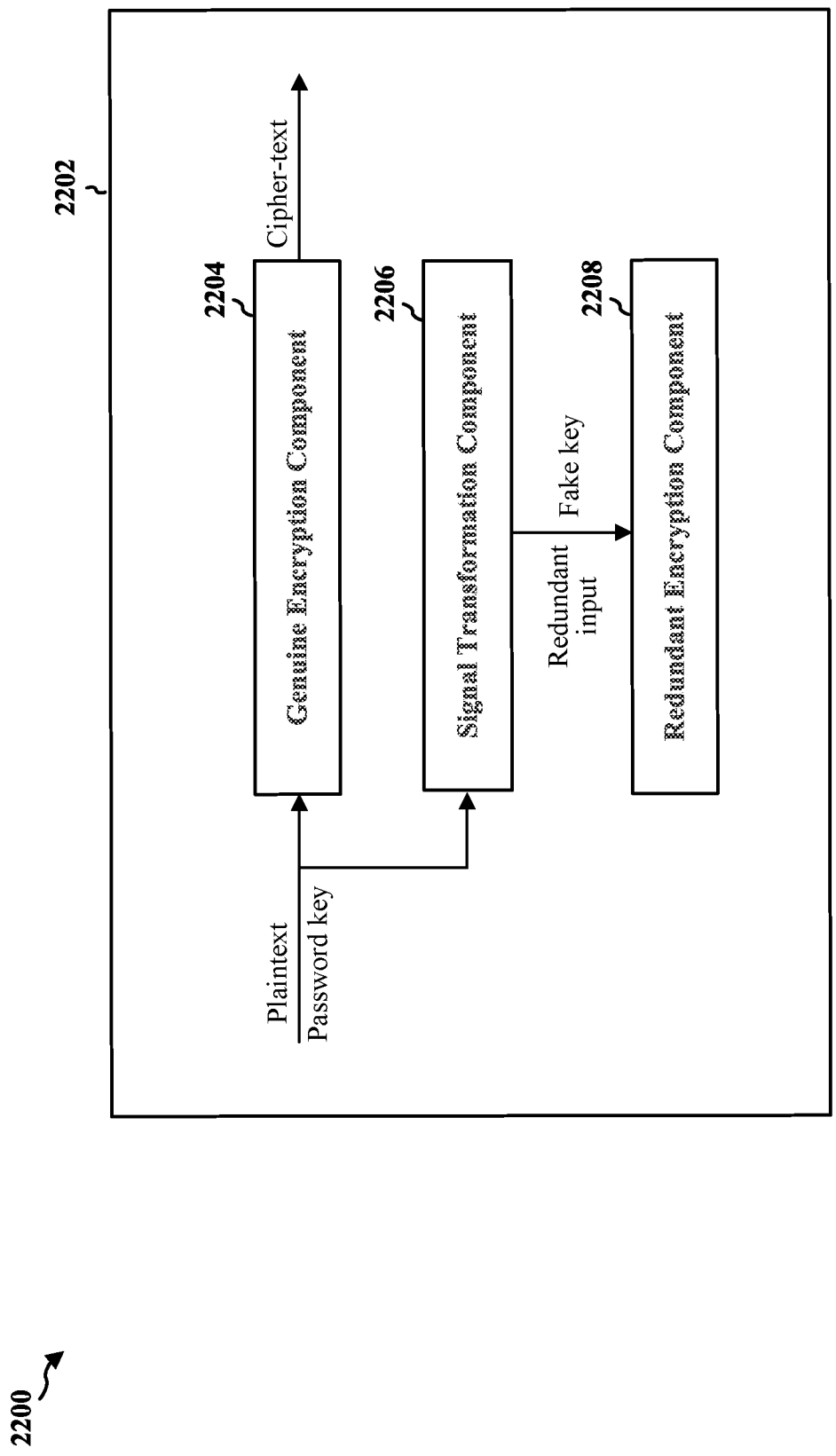
FIG. 22 is a conceptual data flow diagram illustrating the data flow between different means/components in an exemplary apparatus.

FIG. 22 is a conceptual data flow diagram 2200 illustrating the data flow between different means/components in an exemplary apparatus 2202. The apparatus 2202 may be a computing device or a system including multiple computing devices.

The apparatus 2202 may include a genuine encryption component 2204 that uses a password key to encrypt a plaintext into a cipher-text. In one embodiment, the genuine encryption component 2204 may perform the operations described above with reference to 2002 in FIG. 20.

The apparatus 2202 may include a signal transformation component 2206 that derives a redundant input or a fake key based on the plaintext or the password key, respectively.

The apparatus 2202 may include a redundant encryption component 2208 that performs computational imitation based on the redundant input or fake key generated by the signal transformation component 2206. In one embodiment, the redundant encryption component 2208 may perform the operations described above with reference to 2006 in FIG. 20.

The apparatus 2202 may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
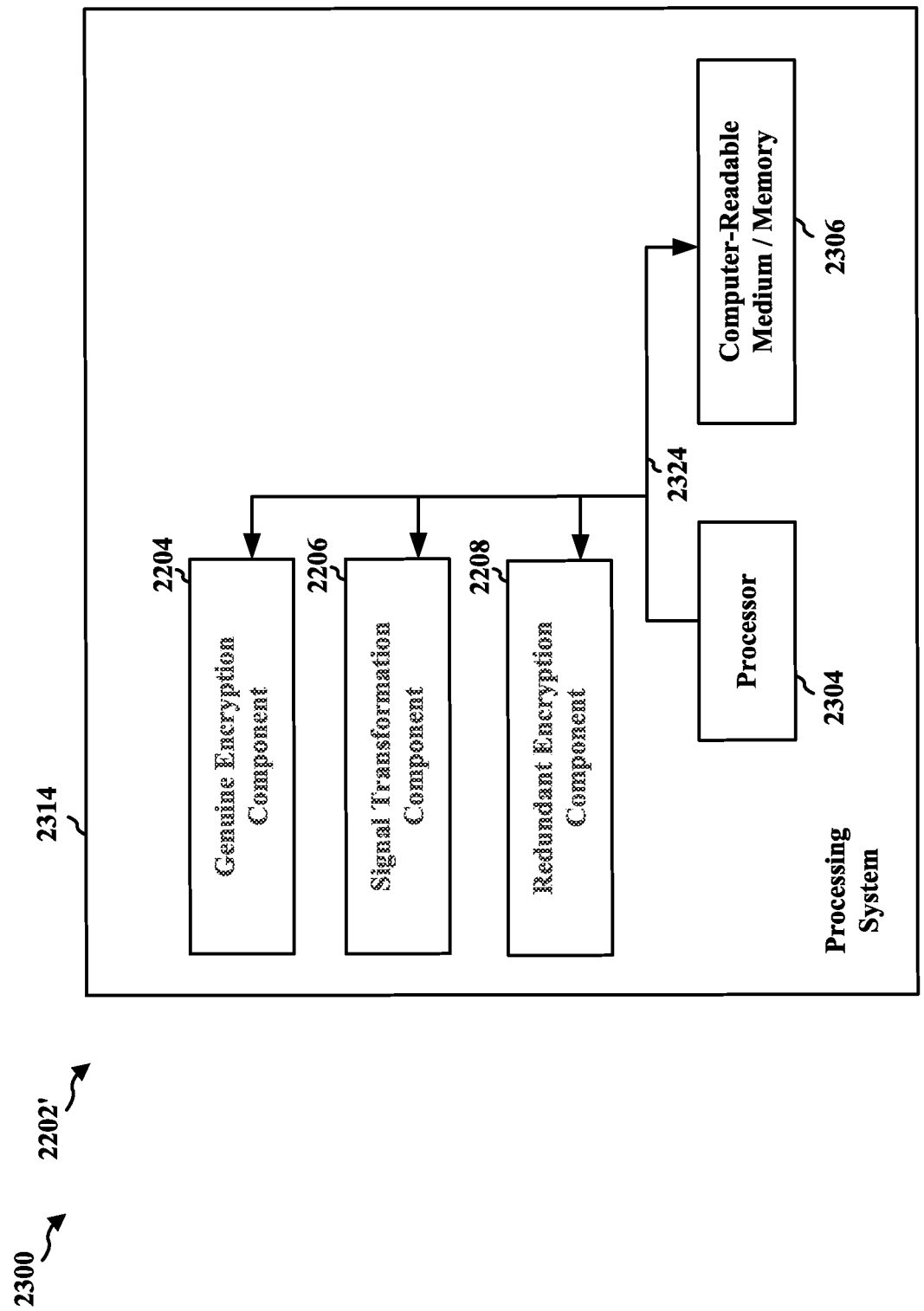
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. In some embodiments, the apparatus 2202' may be the apparatus 2202 described above with reference to FIG. 22. The apparatus 2202' may include one or more computing devices. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, and the computer-readable medium/memory 2306. The bus 2324 may also link various other circuits such as timing sources, peripherals, voltage regulators, and power management circuits, which are well known in the art, and therefore, will not be described any further.

The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208. The components may be software components running in the processor 2304, resident/stored in the computer readable medium/memory 2306, one or more hardware components coupled to the processor 2304, or some combination thereof.

Figure 24:
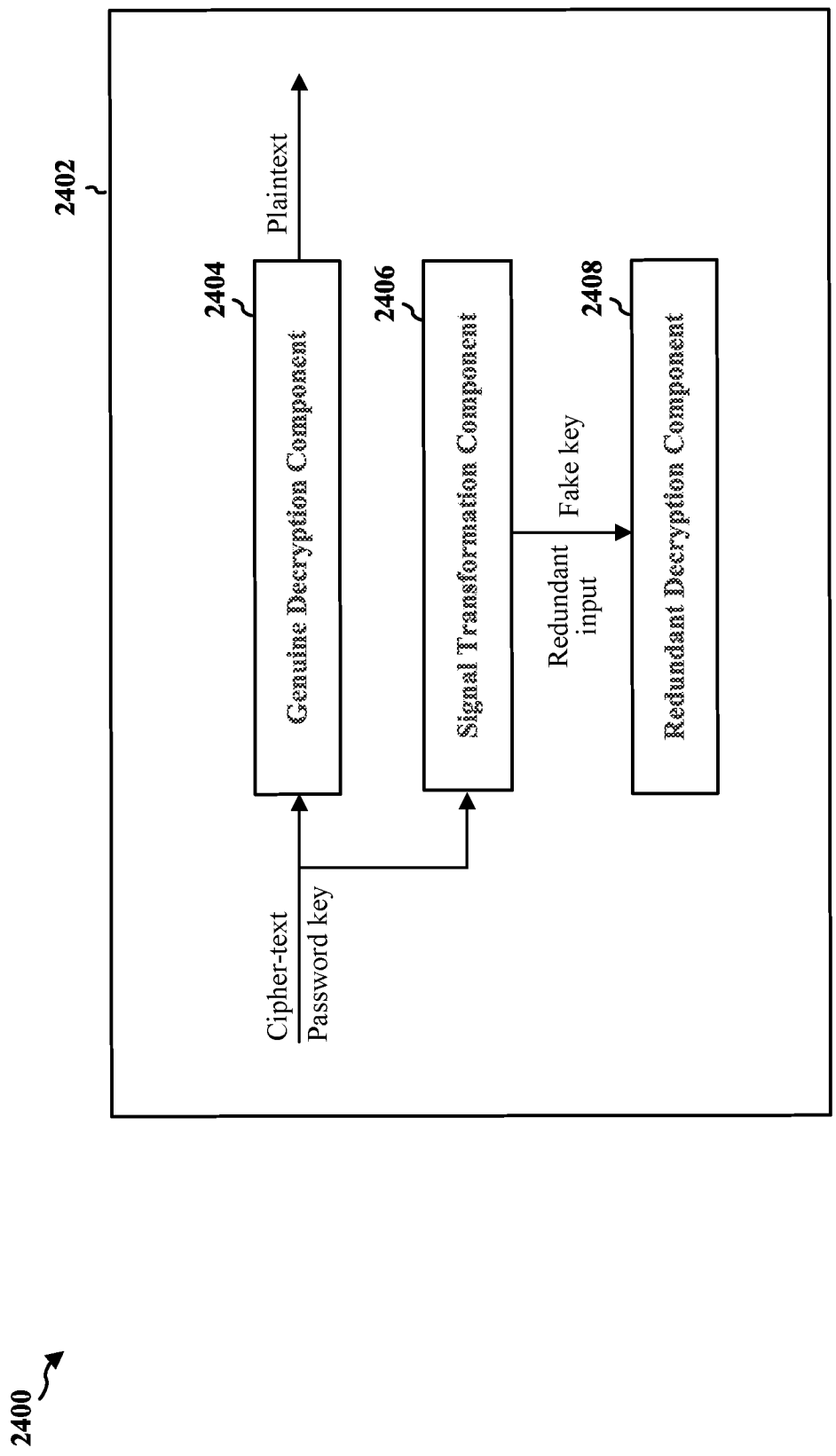
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus 2402 may be a computing device or a system including multiple computing devices.

The apparatus 2402 may include a genuine decryption component 2404 that uses a password key to decrypt a cipher-text into a plaintext. In one embodiment, the genuine decryption component 2404 may perform the operations described above with reference to 2102 in FIG. 21.

The apparatus 2402 may include a signal transformation component 2406 that derives a redundant input or a fake key based on the cipher-text or the password key, respectively.

The apparatus 2402 may include a redundant decryption component 2408 that performs computational imitation based on the redundant input or fake key generated by the signal transformation component 2406. In one embodiment, the redundant decryption component 2408 may perform the operations described above with reference to 2106 in FIG. 21.

The apparatus 2402 may include additional components that perform each of the blocks of the algorithm in the aforementioned flowchart of FIG. 21. As such, each block in the aforementioned flowchart of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
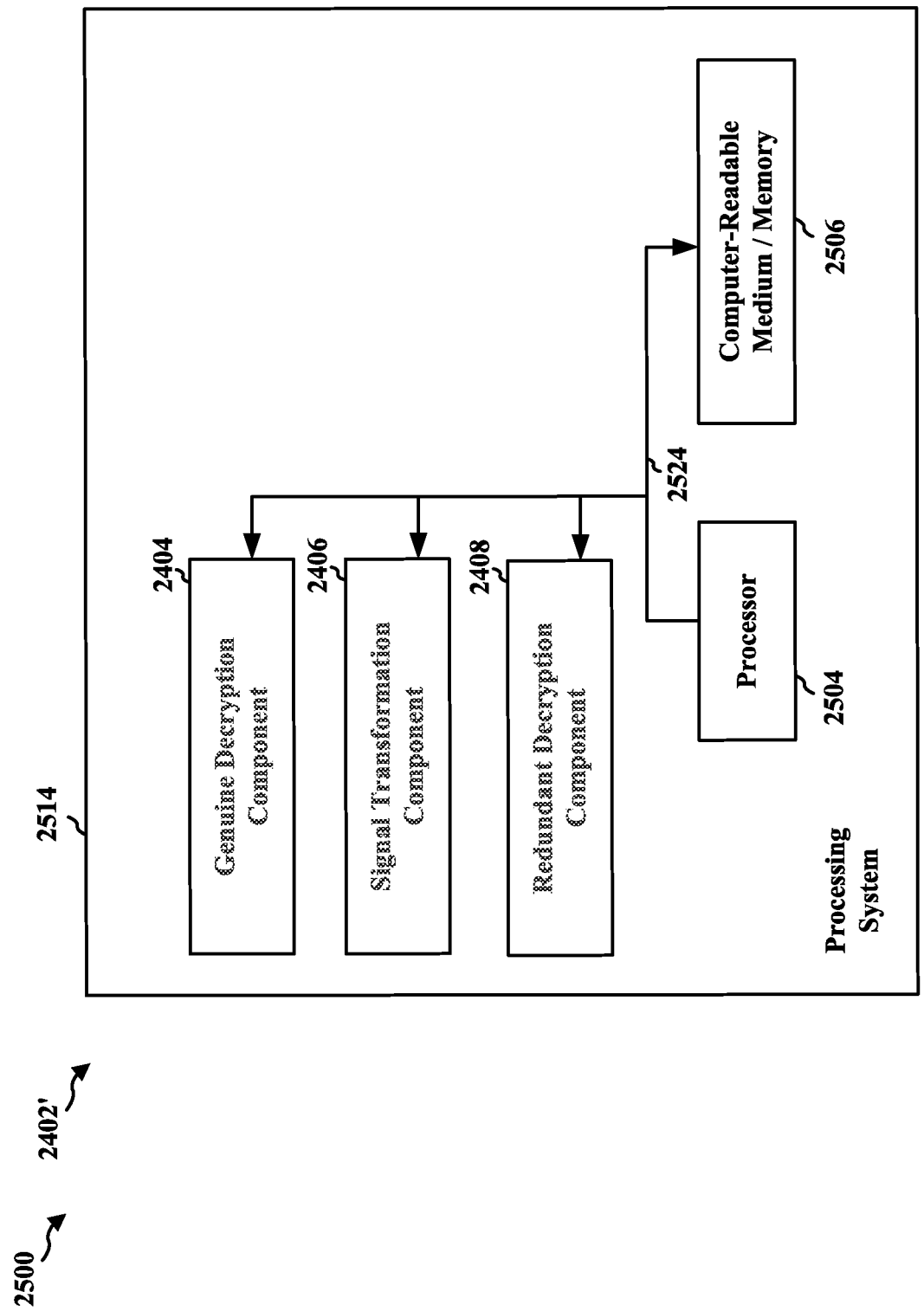
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. In some embodiments, the apparatus 2402' may be the apparatus 2402 described above with reference to FIG. 24. The apparatus 2402' may include one or more computing devices. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, and the computer-readable medium/memory 2506. The bus 2524 may also link various other circuits such as timing sources, peripherals, voltage regulators, and power management circuits, which are well known in the art, and therefore, will not be described any further.

The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408. The components may be software components running in the processor 2504, resident/stored in the computer readable medium/memory 2506, one or more hardware components coupled to the processor 2504, or some combination thereof.

In the following, various aspects of this disclosure will be illustrated:

Example 1 is a method or apparatus for encrypting at least one plaintext to at least one cipher-text using at least one password key. The apparatus may perform at least one genuine computation that is dependent on the at least one plaintext and the at least one password key. The apparatus may emit first analog electrical characteristics in response to the performing of the at least one genuine computation. The apparatus may perform at least one redundant computation that is independent of the at least one plaintext or the at least one password key. The apparatus may emit second analog electrical characteristics in response to the performing of the at least one redundant computation. A metric of similarity between the first analog electrical characteristics and the second analog electrical characteristics may satisfy a threshold.

In Example 2, the subject matter of Example 1 may optionally include that the first analog electrical characteristics or the second analog electrical characteristics include at least one of power dissipation or electromagnetic emission.

In Example 3, the subject matter of any one of Examples 1 to 2 may optionally include that the at least one genuine computation includes at least one round of genuine computation, the at least one redundant computation including at least one round of computational imitation, the sequence of computations for the at least one round of genuine computation and the at least one round of computational imitation being random, the at least one round of genuine computation collectively generating the at least one cipher-text.

In Example 4, the subject matter of any one of Examples 1 to 2 may optionally include that at least one round of computation may be performed to encrypt the at least one plaintext, the at least one round of computation including at least two partial computations, each partial computation including a portion of the at least one genuine computation and a portion of the at least one redundant computation, the at least two partial computations collectively generating the at least one cipher-text.

In Example 5, the subject matter of Example 4 may optionally include that analog electrical characteristics emitted by the apparatus for each partial computation of the at least two partial computations are similar, analog electrical characteristics emitted by the apparatus when a partial computation of the at least two partial computations is performed being similar to analog electrical characteristics emitted by the apparatus when the at least one round of computation is performed.

In Example 6, the subject matter of any one of Examples 1 to 2 may optionally include that at least one round of computation is performed to encrypt the at least one plaintext, the at least one round of computation including at least one iteration of genuine substitution-box computation and at least one iteration of substitution-box computational imitation, the at least one genuine computation including the at least one iteration of genuine substitution-box computation, the at least one redundant computation including the at least one iteration of substitution-box computational imitation.

In Example 7, the subject matter of Example 6 may optionally include that the sequence of computations for the at least one iteration of genuine substitution-box computation and the at least one iteration of substitution-box computational imitation is random, the at least one iteration of genuine substitution-box computation collectively generating the at least one cipher-text.

In Example 8, the subject matter of any one of Examples 1 to 7 may optionally include that the at least one genuine computation is performed based on at least one of a first input and a first key, the first input derived from the at least one plaintext and the first key derived from the at least one password key, the at least one redundant computation being performed based on at least one of a second input or a second key, the first input having the same Hamming weight as the second input.

In Example 9, the subject matter of any one of Examples 1 to 7 may optionally include that the at least one genuine computation is performed based on at least one of a first input and a first key, the first input derived from the at least one plaintext and the first key derived from the at least one password key, the at least one redundant computation being performed based on at least one of a second input or a second key, the first key having the same Hamming weight as the second key.

In Example 10, the subject matter of any one of Examples 1 to 9 may optionally include that the metric is one of Normalized Absolute Difference, correlation coefficient, or correlation coefficient of variance, the metric being derived from key leakage regions of the first analog electrical characteristics and the second analog electrical characteristics.

Example 11 is a method or apparatus for decrypting at least one cipher-text to at least one plaintext using at least one password key. The apparatus may perform at least one genuine computation that is dependent on the at least one cipher-text and the at least one password key. The apparatus may emit first analog electrical characteristics in response to the performing of the at least one genuine computation. The apparatus may perform at least one redundant computation that is independent of the at least one cipher-text or the at least one password key. The apparatus may emit second analog electrical characteristics in response to the performing of the at least one redundant computation. A metric of similarity between the first analog electrical characteristics and the second analog electrical characteristics may satisfy a threshold.

In Example 12, the subject matter of Example 11 may optionally include that the first analog electrical characteristics or the second analog electrical characteristics include at least one of power dissipation or electromagnetic emission.

In Example 13, the subject matter of any one of Examples 11 to 12 may optionally include that the at least one genuine computation includes at least one round of genuine computation, the at least one redundant computation including at least one round of computational imitation, the sequence of computations for the at least one round of genuine computation and the at least one round of computational imitation being random, the at least one round of genuine computation collectively generating the at least one plaintext.

In Example 14, the subject matter of any one of Examples 11 to 12 may optionally include that at least one round of computation may be performed to decrypt the at least one cipher-text, the at least one round of computation including at least two partial computations, each partial computation including a portion of the at least one genuine computation and a portion of the at least one redundant computation, the at least two partial computations collectively generating the at least one plaintext.

In Example 15, the subject matter of Example 14 may optionally include that analog electrical characteristics emitted by the apparatus for each partial computation of the at least two partial computations are similar, analog electrical characteristics emitted by the apparatus when a partial computation of the at least two partial computations is performed being similar to analog electrical characteristics emitted by the apparatus when the at least one round of computation is performed.

In Example 16, the subject matter of any one of Examples 11 to 12 may optionally include that at least one round of computation is performed to decrypt the at least one cipher-text, the at least one round of computation including at least one iteration of genuine inverse substitution-box computation and at least one iteration of inverse substitution-box computational imitation, the at least one genuine computation including the at least one iteration of genuine inverse substitution-box computation, the at least one redundant computation including the at least one iteration of inverse substitution-box computational imitation.

In Example 17, the subject matter of Example 16 may optionally include that the sequence of computations for the at least one iteration of genuine inverse substitution-box computation and the at least one iteration of inverse substitution-box computational imitation is random, the at least one iteration of genuine inverse substitution-box computation collectively generating the at least one plaintext.

In Example 18, the subject matter of any one of Examples 11 to 17 may optionally include that the at least one genuine computation is performed based on at least one of a first input and a first key, the first input derived from the at least one cipher-text and the first key derived from the at least one password key, the at least one redundant computation being performed based on at least one of a second input or a second key, the first input having the same Hamming weight as the second input.

In Example 19, the subject matter of any one of Examples 11 to 17 may optionally include that the at least one genuine computation is performed based on at least one of a first input and a first key, the first input derived from the at least one cipher-text and the first key derived from the at least one password key, the at least one redundant computation being performed based on at least one of a second input or a second key, the first key having the same Hamming weight as the second key.

In Example 20, the subject matter of any one of Examples 11 to 19 may optionally include that the metric is one of Normalized Absolute Difference, correlation coefficient, or correlation coefficient of variance, the metric being derived from key leakage regions of the first analog electrical characteristics and the second analog electrical characteristics.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for encrypting at least one plaintext to at least one cipher-text using at least one password key, the apparatus comprising:
    at least one memory; and
    at least one processor coupled to the at least one memory and configured to:
        perform at least one genuine computation that is dependent on the at least one plaintext and the at least one password key; and
        perform at least one redundant computation that is independent of the at least one plaintext or the at least one password key,
        wherein the apparatus emits first analog electrical characteristics when the at least one genuine computation is performed and emits second analog electrical characteristics when the at least one redundant computation is performed, wherein the at least one genuine computation is performed based on at least one of a first input and a first key, the first input derived from the at least one plaintext and the first key derived from the at least one password key, wherein the at least one redundant computation is performed based on at least one of a second input or a second key, and wherein the second input has a same signal property as the first input and/or the second key has a same signal property as the first key so that a metric of similarity between the first analog electrical characteristics and the second analog electrical characteristics satisfies a threshold.

2. The apparatus of claim 1, wherein the first analog electrical characteristics or the second analog electrical characteristics comprise at least one of power dissipation or electromagnetic emission.

3. The apparatus of claim 1, wherein the at least one genuine computation comprises at least one round of genuine computation, wherein the at least one redundant computation comprises at least one round of computational imitation, wherein a sequence of computations for the at least one round of genuine computation and the at least one round of computational imitation is random, wherein the at least one round of genuine computation collectively generates the at least one cipher-text.

4. The apparatus of claim 1, wherein at least one round of computation is performed to encrypt the at least one plaintext, wherein the at least one round of computation comprises at least two partial computations, wherein each partial computation comprises a portion of the at least one genuine computation and a portion of the at least one redundant computation, wherein the at least two partial computations collectively generate the at least one cipher-text.

5. The apparatus of claim 4, wherein analog electrical characteristics emitted by the apparatus for each partial computation of the at least two partial computations are similar, wherein analog electrical characteristics emitted by the apparatus when a partial computation of the at least two partial computations is performed are similar to analog electrical characteristics emitted by the apparatus when the at least one round of computation is performed.

6. The apparatus of claim 1, wherein at least one round of computation is performed to encrypt the at least one plaintext, wherein the at least one round of computation comprises at least one iteration of genuine substitution-box computation and at least one iteration of substitution-box computational imitation, wherein the at least one genuine computation comprises the at least one iteration of genuine substitution-box computation, wherein the at least one redundant computation comprises the at least one iteration of substitution-box computational imitation, wherein a sequence of computations for the at least one iteration of genuine substitution-box computation and the at least one iteration of substitution-box computational imitation is random, wherein the at least one iteration of genuine substitution-box computation collectively generates the at least one cipher-text.

7. The apparatus of claim 1, wherein the first input has the same Hamming weight as the second input.

8. The apparatus of claim 1, wherein the first key has the same Hamming weight as the second key.

9. The apparatus of claim 1, wherein the metric is one of Normalized Absolute Difference, correlation coefficient, or correlation coefficient of variance, wherein the metric is derived from key leakage regions of the first analog electrical characteristics and the second analog electrical characteristics.

10. An apparatus for decrypting at least one cipher-text to at least one plaintext using at least one password key, the apparatus comprising:
    at least one memory; and
    at least one processor coupled to the at least one memory and configured to:
        perform at least one genuine computation that is dependent on the at least one cipher-text and the at least one password key; and
        perform at least one redundant computation that is independent of the at least cipher-text or the at least one password key;
        wherein the apparatus emits first analog electrical characteristics when the at least one genuine computation is performed and emits second analog electrical characteristics when the at least one redundant computation is performed, wherein the at least one genuine computation is performed based on at least one of a first input and a first key, the first input derived from the at least one cipher-text and the first key derived from the at least one password key, wherein the at least one redundant computation is performed based on at least one of a second input or a second key, and wherein the second input has a same signal property as the first input and/or the second key has a same signal property as the first key so that a metric of similarity between the first analog electrical characteristics and the second analog electrical characteristics satisfies a threshold.

11. The apparatus of claim 10, wherein the first analog electrical characteristics or the second analog electrical characteristics comprise at least one of power dissipation or electromagnetic emission.

12. The apparatus of claim 10, wherein the at least one genuine computation comprises at least one round of genuine computation, wherein the at least one redundant computation comprises at least one round of computational imitation, wherein a sequence of computations for the at least one round of genuine computation and the at least one round of computational imitation is random, wherein the at least one round of genuine computation collectively generates the at least one plaintext.

13. The apparatus of claim 10, wherein at least one round of computation is performed to decrypt the at least one cipher-text, wherein the at least one round of computation comprises at least two partial computations, wherein each partial computation comprises a portion of the at least one genuine computation and a portion of the at least one redundant computation, wherein the at least two partial computations collectively generate the at least one plaintext.

14. The apparatus of claim 13, wherein analog electrical characteristics emitted by the apparatus for each partial computation of the at least two partial computations are similar, wherein analog electrical characteristics emitted by the apparatus when a partial computation of the at least two partial computations is performed are similar to analog electrical characteristics emitted by the apparatus when the at least one round of computation is performed.

15. The apparatus of claim 10, wherein at least one round of computation is performed to decrypt the at least one cipher-text, wherein the at least one round of computation comprises at least one iteration of genuine inverse substitution-box computation and at least one iteration of inverse substitution-box computational imitation, wherein the at least one genuine computation comprises the at least one iteration of genuine inverse substitution-box computation, wherein the at least one redundant computation comprises the at least one iteration of inverse substitution-box computational imitation, wherein a sequence of computations for the at least one iteration of genuine inverse substitution-box computation and the at least one iteration of inverse substitution-box computational imitation is random, wherein the at least one iteration of genuine inverse substitution-box computation collectively generates the at least one plaintext.

16. The apparatus of claim 10, wherein the first input has the same Hamming weight as the second input.

17. The apparatus of claim 10, wherein the first key has the same Hamming weight as the second key.

18. The apparatus of claim 10, wherein the metric is one of Normalized Absolute Difference, correlation coefficient, or correlation coefficient of variance, wherein the metric is derived from key leakage regions of the first analog electrical characteristics and the second analog electrical characteristics.

19. A method of encrypting at least one plaintext to at least one cipher-text using at least one password key, the method comprising:
    performing, by a computing device, at least one genuine computation that is dependent on the at least one plaintext and the at least one password key;
    emitting, by the computing device, first analog electrical characteristics in response to the performing of the at least one genuine computation;
    performing, by the computing device, at least one redundant computation that is independent of the at least one plaintext or the at least one password key; and
    emitting, by the computing device, second analog electrical characteristics in response to the performing of the at least one redundant computation,
    wherein the at least one genuine computation is performed based on at least one of a first input and a first key, the first input derived from the at least one plaintext and the first key derived from the at least one password key, wherein the at least one redundant computation is performed based on at least one of a second input or a second key, and wherein the second input has a same signal property as the first input and/or the second key has a same signal property as the first key so that a metric of similarity between the first analog electrical characteristics and the second analog electrical characteristics satisfies a threshold.

20. A method of decrypting at least one cipher-text to at least one plaintext using at least one password key, the method comprising:
    performing, by a computing device, at least one genuine computation that is dependent on the at least one cipher-text and the at least one password key;
    emitting, by the computing device, first analog electrical characteristics in response to the performing of the at least one genuine computation;
    performing, by the computing device, at least one redundant computation that is independent of the at least one cipher-text or the at least one password key; and
    emitting, by the computing device, second analog electrical characteristics in response to the performing of the at least one redundant computation,
    wherein the at least one genuine computation is performed based on at least one of a first input and a first key, the first input derived from the at least one cipher-text and the first key derived from the at least one password key, wherein the at least one redundant computation is performed based on at least one of a second input or a second key, and wherein the second input has a same signal property as the first input and/or the second key has a same signal property as the first key so that a metric of similarity between the first analog electrical characteristics and the second analog electrical characteristics satisfies a threshold.

* * * * *